Nov. 9, 1965 R. K. H. GEBEL 3,217,099

SEQUENTIAL LIGHT AMPLIFIER SYSTEM

Filed April 17, 1963 14 Sheets-Sheet 1

INVENTOR.
R. K. H. GEBEL
BY Wade Koontz
ATTORNEY and
James S. Shannon
AGENT

SEQUENTIAL LIGHT AMPLIFIER SYSTEM

Filed April 17, 1963 14 Sheets-Sheet 2

INVENTOR.
R. K. H. GEBEL
BY Wade Koontz
ATTORNEY
James S. Shannon
AGENT

INVENTOR.
R.K.H. GEBEL
BY Wade Koontz
ATTORNEY
James S. Shannon and
AGENT

SEQUENTIAL LIGHT AMPLIFIER SYSTEM

Filed April 17, 1963

INVENTOR.
R. K. H. GEBEL

BY Wade Koontz
ATTORNEY and
James S. Shannon
AGENT

Nov. 9, 1965 R. K. H. GEBEL 3,217,099

SEQUENTIAL LIGHT AMPLIFIER SYSTEM

Filed April 17, 1963 14 Sheets-Sheet 5

INVENTOR.
R. K. H. GEBEL
BY Wade Koontz
ATTORNEY
and
James S. Shannon
AGENT

Nov. 9, 1965 R. K. H. GEBEL 3,217,099

SEQUENTIAL LIGHT AMPLIFIER SYSTEM

Filed April 17, 1963 14 Sheets-Sheet 6

INVENTOR.
R. K. H. GEBEL

BY Wade Koontz
ATTORNEY and
James S. Shannon
AGENT

Nov. 9, 1965 R. K. H. GEBEL 3,217,099

SEQUENTIAL LIGHT AMPLIFIER SYSTEM

Filed April 17, 1963 14 Sheets-Sheet 7

INVENTOR.
R. K. H. GEBEL

BY Wade Koontz
ATTORNEY
James S. Shannon
AGENT

Nov. 9, 1965 R. K. H. GEBEL 3,217,099

SEQUENTIAL LIGHT AMPLIFIER SYSTEM

Filed April 17, 1963 14 Sheets-Sheet 8

INVENTOR.
R.K.H. GEBEL
BY Wade Koontz
ATTORNEY
James S. Shannon
AGENT

INVENTOR.
R.K.H. GEBEL
BY Wade Koontz
ATTORNEY
James S. Shannon and
AGENT

Nov. 9, 1965 R. K. H. GEBEL 3,217,099

SEQUENTIAL LIGHT AMPLIFIER SYSTEM

Filed April 17, 1963 14 Sheets-Sheet 10

INVENTOR.
R. K. H. GEBEL
BY Wade Koontz
ATTORNEY
James S. Shannon
AGENT

Nov. 9, 1965 R. K. H. GEBEL 3,217,099

SEQUENTIAL LIGHT AMPLIFIER SYSTEM

Filed April 17, 1963 14 Sheets-Sheet 11

INVENTOR.
R. K. H. GEBEL

BY
ATTORNEY
and
AGENT

SEQUENTIAL LIGHT AMPLIFIER SYSTEM

Filed April 17, 1963 14 Sheets-Sheet 12

INVENTOR.
R. K. H. GEBEL
BY Wade Koontz
ATTORNEY
James S. Shannon
AGENT

Nov. 9, 1965 R. K. H. GEBEL 3,217,099

SEQUENTIAL LIGHT AMPLIFIER SYSTEM

Filed April 17, 1963 14 Sheets-Sheet 13

INVENTOR.
R. K. H. GEBEL

BY Wade Koontz
ATTORNEY
James S. Shannon
AGENT

SEQUENTIAL LIGHT AMPLIFIER SYSTEM

Filed April 17, 1963 14 Sheets-Sheet 14

INVENTOR.
R. K. H. GEBEL
BY
ATTORNEY
and
AGENT

United States Patent Office 3,217,099
Patented Nov. 9, 1965

3,217,099
SEQUENTIAL LIGHT AMPLIFIER SYSTEM

Radames K. H. Gebel, Dayton, Ohio, assignor to the United States of America as represented by the Secretary of the Air Force Filed Apr. 17, 1963, Ser. No. 273,794
6 Claims. (Cl. 178—6.8)
(Granted under Title 35, U.S. Code (1952), sec. 266)

Figure 1A:
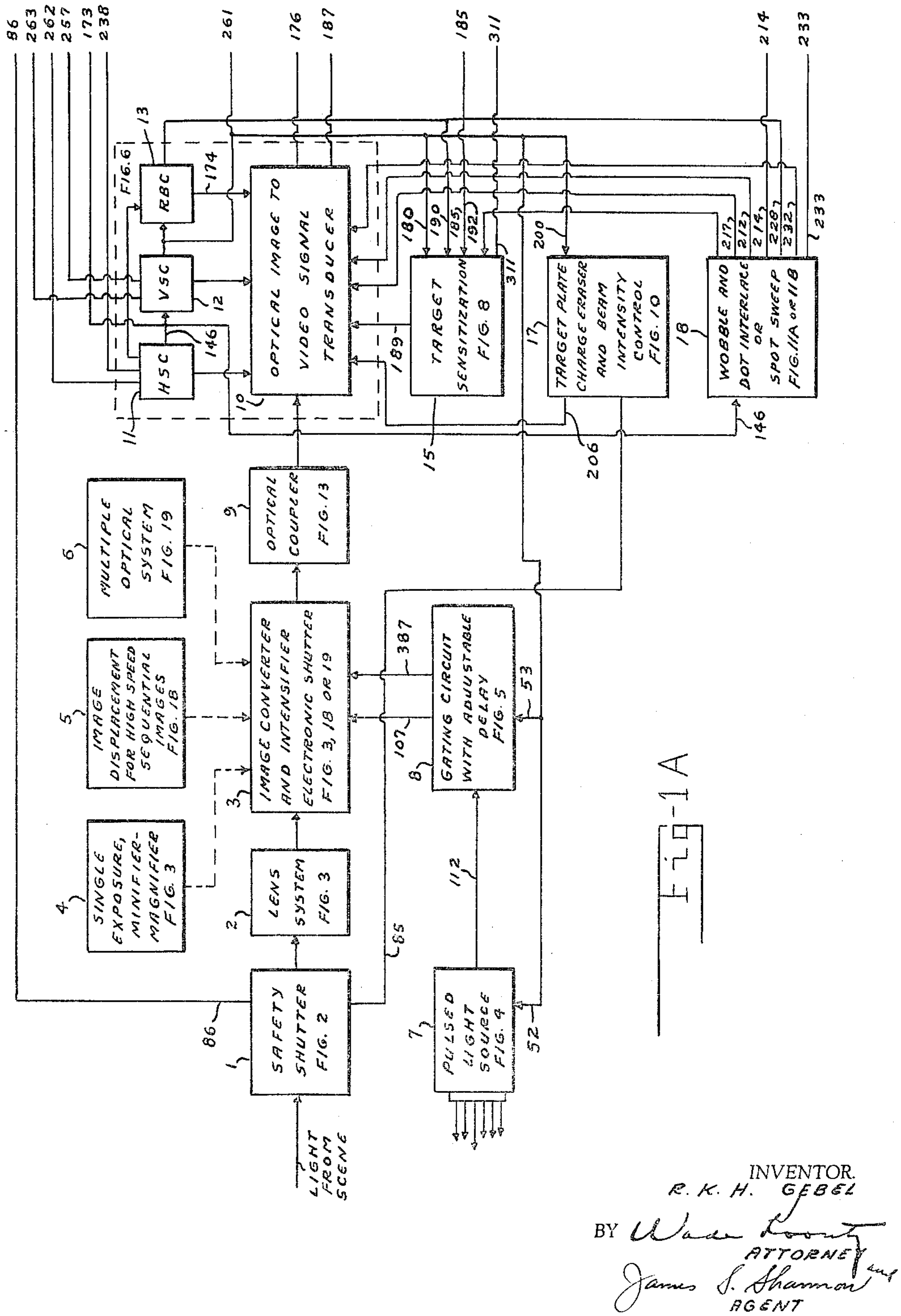

The invention described herein may be manufactured and used by or for the United States Government for governmental purposes without payment to me of any royalty thereon.

The purpose of this invention is to provide a light amplification system for use in military and scientific fields to observe objects or to photograph objects at light levels for which the human eye or present photographic systems with short exposures are not sufficiently sensitive. In addition to the sensing of extremely low light levels, it is also a purpose of the invention to increase the contrast between objects in the field of view so that brightness differences too small to be sensed by the unaided human eye may be readily perceived. This is of particular importance in high speed aircraft or in photographing rapidly moving objects or rapidly occurring events, since the time required for the eye or a photographic plate to discriminate between objects depends upon the brightness difference. The light sensing element in the system is a photo-cathode which converts photons into electrons and which also has a certain electron emission, called the dark current, when there are no incident photons. It is a further purpose of the invention to provide a system capable of detecting objects of low brightness and of discriminating between objects of low contrast down to the limitation imposed by the random fluctuations of the dark current and the random nature of the photon to electron conversion process.

Considering further the limitations on light amplification and brightness discrimination, light, because of its quantum nature, does not flow at a uniform rate but its nature is such that the light emanating from an area of uniform brightness has both a temporal and spatial variation, so that, if this area is imaged on a focal plane for a short exposure time, all elemental areas of the image will not receive the same number of photons. It is usually assumed that the probability of the deviation in the number of photons to which the different elemental areas have been exposed corresponds to a Poisson distribution. Therefore, the standard deviation in either direction from the average is approximately the square root of the average number of collected photons during the exposure time for the elemental area. Light, therefore, has in effect a signal to noise ratio in which the average value of the photon flow is the signal and the deviation equal to the square root of the average value is the noise. Consequently, as the light flux decreases, the noise becomes an increasingly greater percentage of the signal until at very low fluxes the signal is lost in the noise. However, where a photocathode is used to detect light, the natural fluctuation of light is not the limiting factor in determining the threshold of detectability, but rather it is either the similar random fluctuation of the dark current or the random nature of the photon to electron conversion process in the photocathode. If it were possible for an elemental area of the photocathode to receive photons at a constant rate, the electron flow in the electron image of the elemental area produced by the photocathode would, nevertheless, not be at a constant rate but would have a random variation similar to that of light with a standard deviation from its average value approximately equal to the square root of its average value. Since presently known photocathodes have a conversion efficiency considerably less than unity, the deviation as a percentage of the average is greater in the case of the electron image current than in the case of the light flowing from the object which produced the electron image and as a result becomes the limiting factor. Therefore, it may be stated that the probability of detecting an object against the background of dark current becomes so small as to have no practical value when the excess of the average value of the electron image current over the average value of the dark current is reduced to equality with the standard deviation of the dark current. Similarly, for two elemental areas in an image that are detectable against the dark current background, the probability of discriminating the two areas has a practical value only when the average current in the electron image of the brighter exceeds the average current in the electron image of the darker by an amount in excess of the standard deviation for the darker. From this it is seen that the difference in brightness required to discriminate between two elemental areas as a percentage of the brightness decreases as the brightness increases, since the deviations become a smaller percentage of the average values as the average values increase.

The light amplifier system described herein is so designed that the thresholds of detectability and contrast discrimination established at the input photocathode, as described above, are not raised by any of the subsequent apparatus. Briefly, the system comprises five principal elements, namely: the input optical system, the image converter, the image transducer, the video circuits and the reproducer.

The input optical system is normally a lens system of high relative aperture for forming as bright an image as possible of the field of view on the light sensor of the image converter.

The purpose of the image converter is primarily that of preamplification, i.e., of increasing the image brightness before its application to the image transducer, for obtaining a high signal to noise ratio in the transducer. The input element or light sensor of the image converter is a photocathode which converts the incident optical image into a corresponding electron image which is then intensified and reconverted by a phosphor screen to an optical image many times brighter than the input image. The image converter also provides the incidental functions of an electronic shutter and of minification or magnification of the image. The image converter may also take highly specialized forms which provide for rapid sequence photography or for the use of a split beam two-color input optical system. The image converter may also be used to produce an optical image at a wavelength different from the wavelength of the input image and adapted to the sensitivity range of the succeeding image transducer.

The function of the image transducer is to convert the information in an optical image into a sequential electrical signal, the video signal, by a scanning process. It also has a photocathode as its input element. The amplified optical image on the phosphor of the image converter is transferred to the photocathode of the image transducer where it is again converted to an electron image which, after intensification, is converted to a corresponding charge pattern at a target electrode. The target is scanned by a low velocity electron beam to produce the video signal. The limiting factor on the sensitivity of the image transducer is the noise generated in the scanning beam. The preamplification obtained in the image converter and in the image intensifier of the transducer is made sufficiently great that the scanning beam modulation derived from the charge on the target even at the lowest light levels exceeds the beam noise sufficiently to give a usable signal to noise ratio in the video signal. Target sensitization is used with the image transducer to increase its sensitivity to low light levels. Beam feedback modulation and field sequential target plate charge erasing and beam intensity control techniques are used to increase the brightness range. Also, special scanning modes such as spot sweep and dot interlase and beam wobble are employed to increase the resolution and sensitivity. Before leaving the transducer the video signal is amplified many times in a low noise electron multiplier to insure a signal level well above the noise generated in the first stages of the subsequent video circuits.

The video circuits, in addition to video amplification for increasing the contrast, provide selective signal polarity reversal, horizontal and vertical shading, automatic gain control, threshold and amplitude limitation, gamma or contrast control, bandwidth control, various forms of signal modification and direct current restoration.

Finally, the reproducer converts the amplified video signal into a visual image for observation or photographic recording.

Figure 1B:
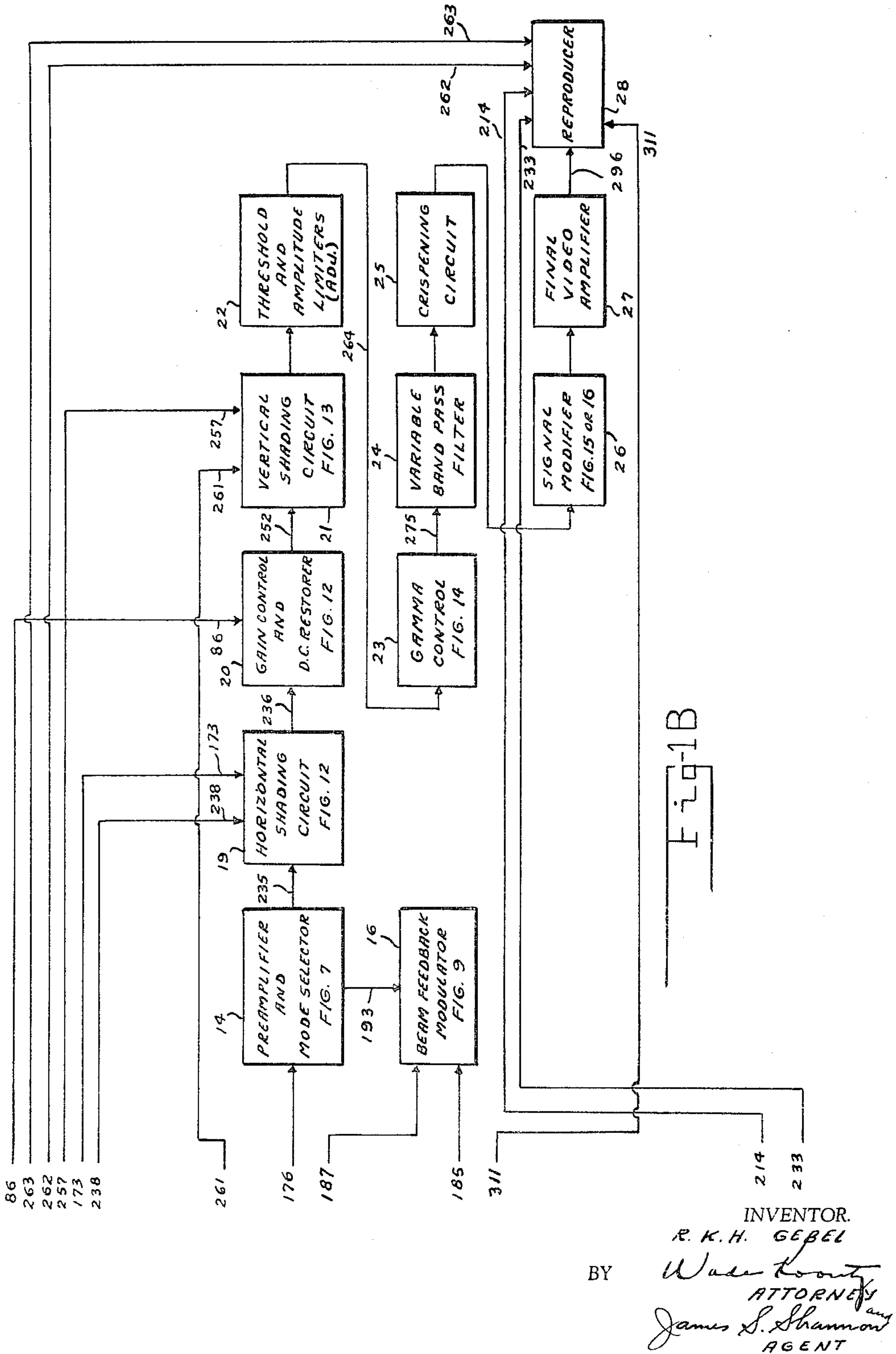
Figure 2:
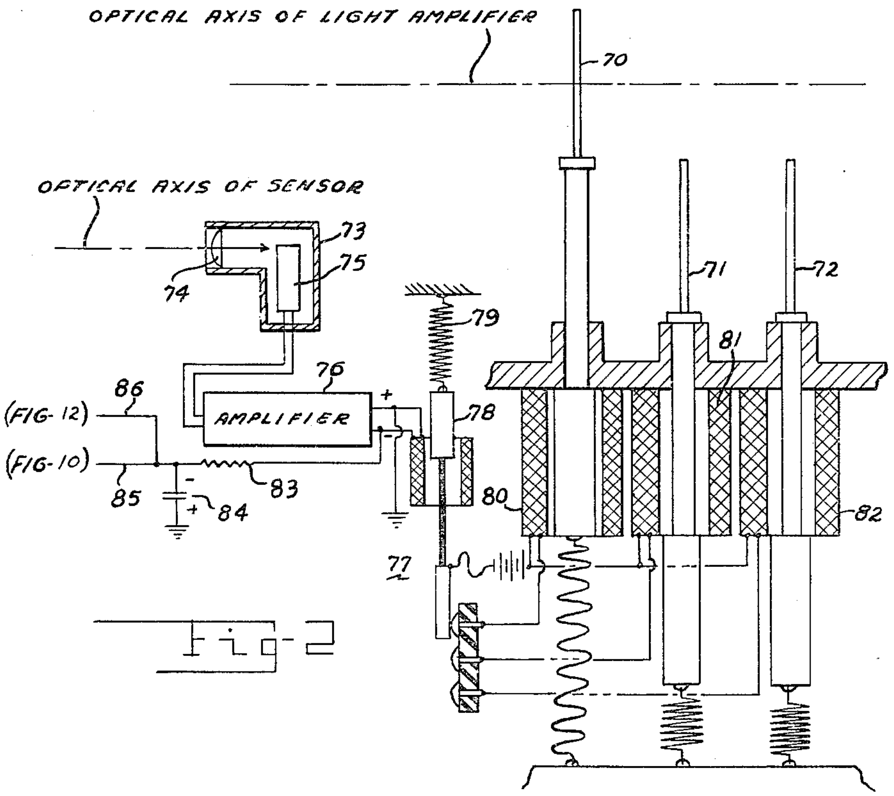
Figure 4:
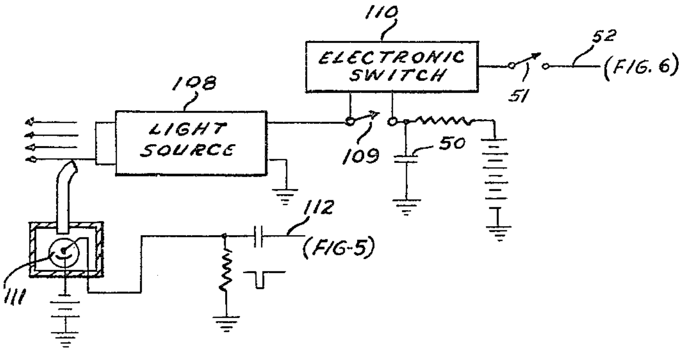
Figures 3, 3A, 3B, 5:
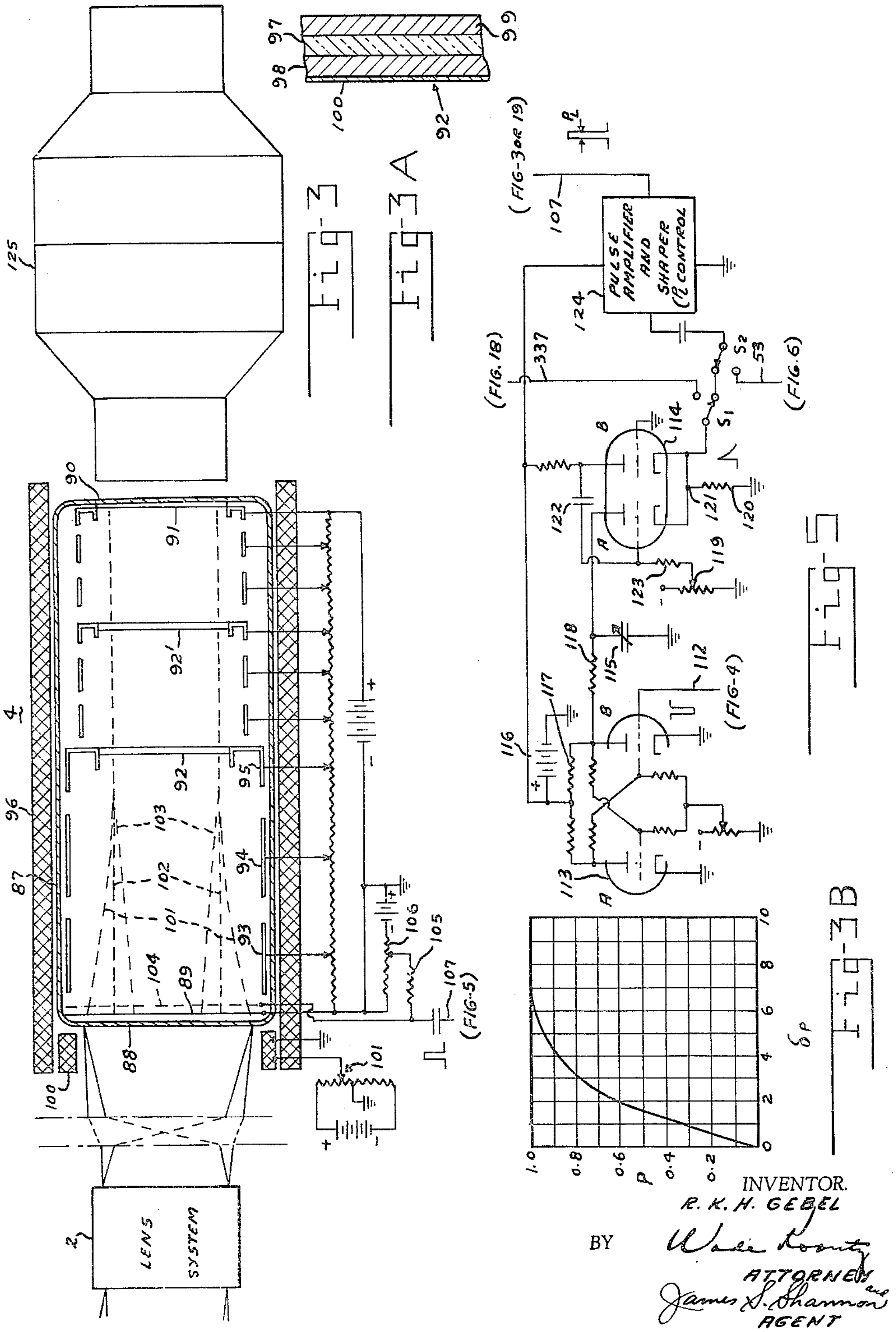
Figure 6:
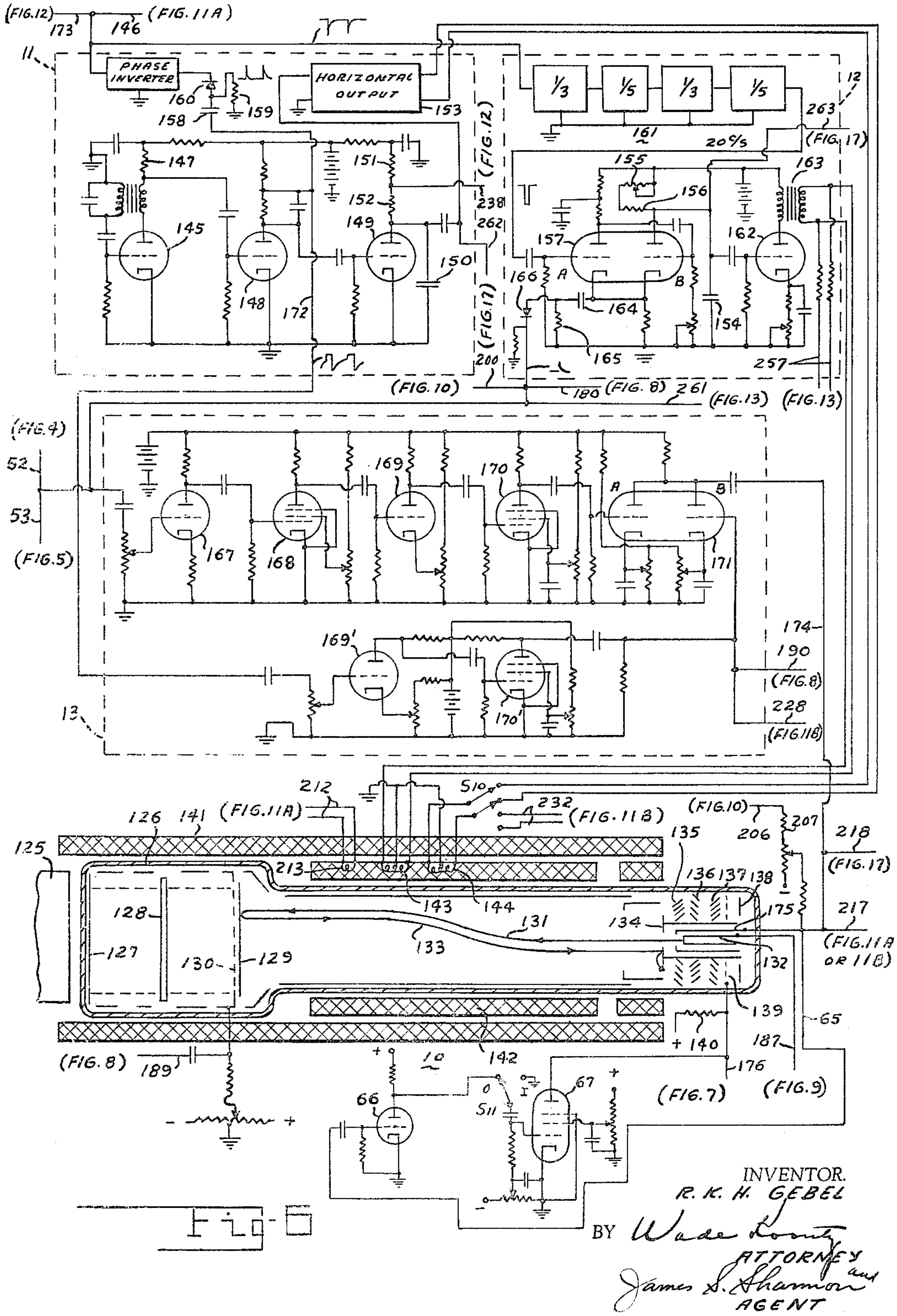
Figure 7:
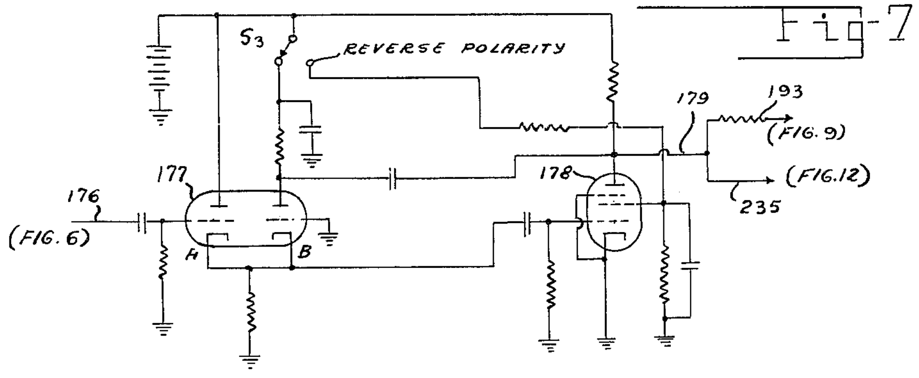
Figure 8:
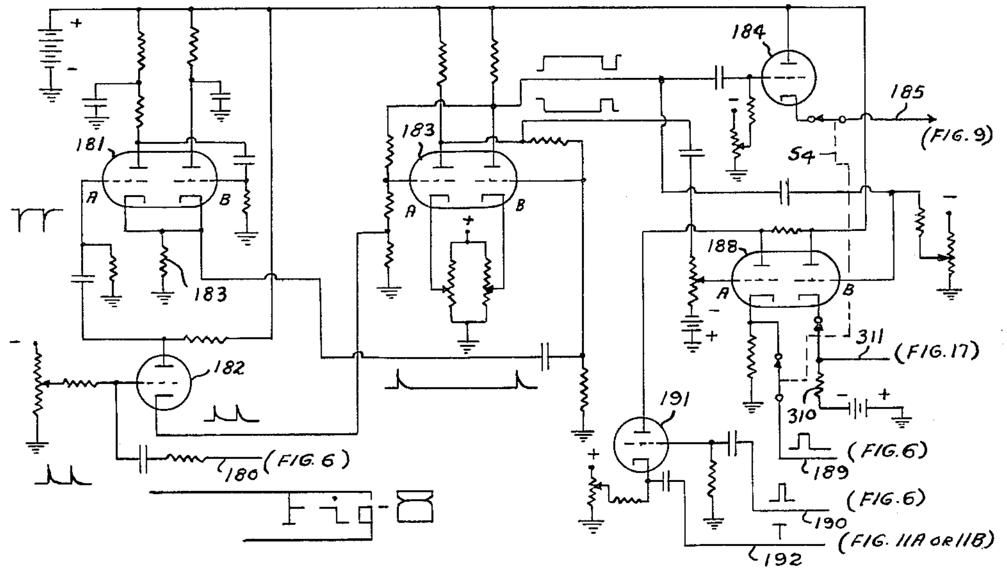
Figure 8A:
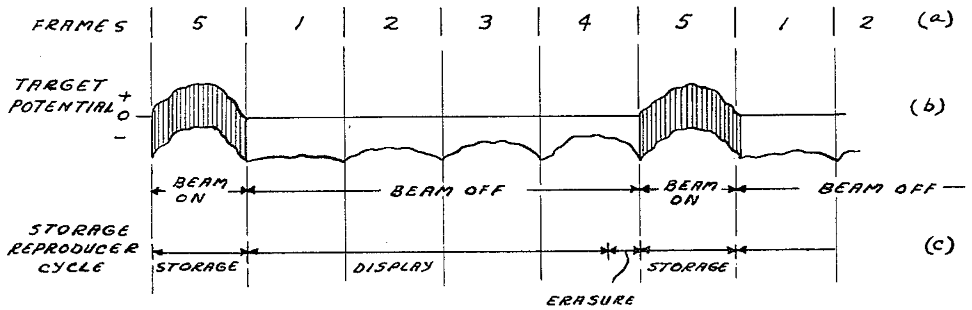
Figure 9:
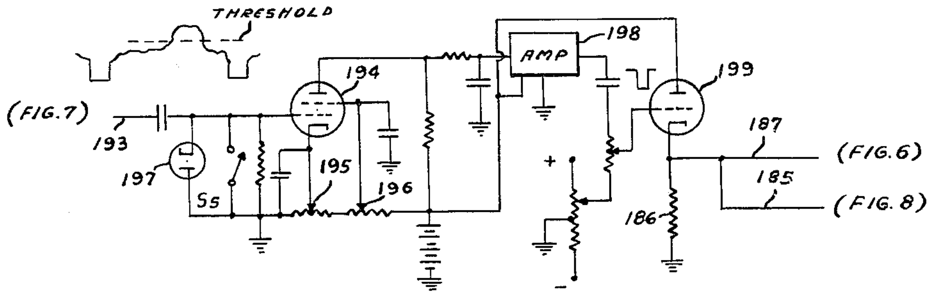
Figure 10:
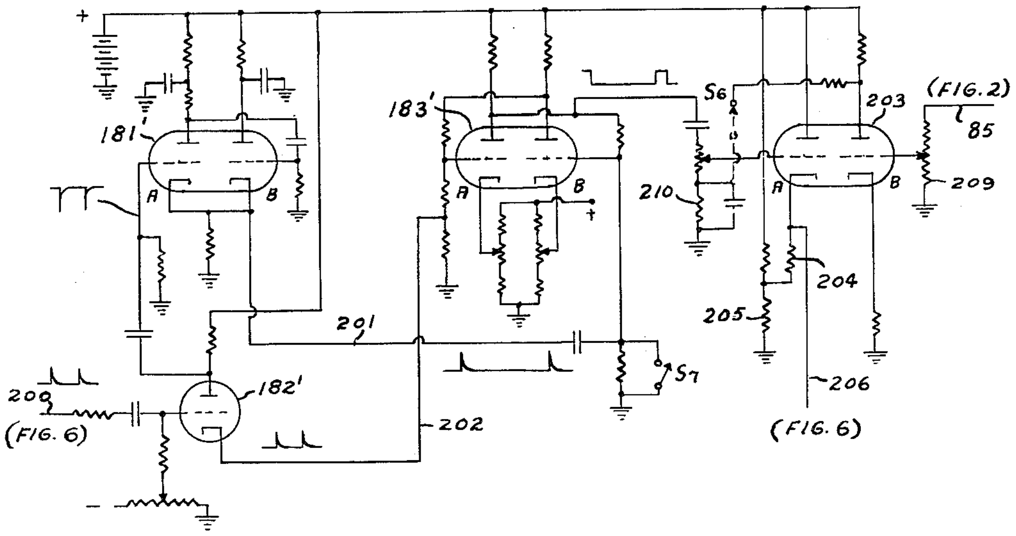
Figure 11A:
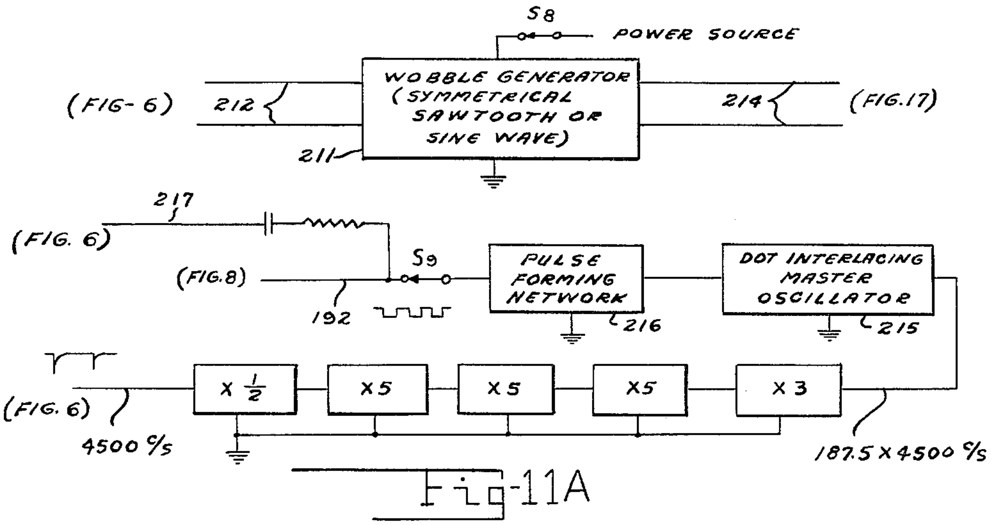
Figure 11B:
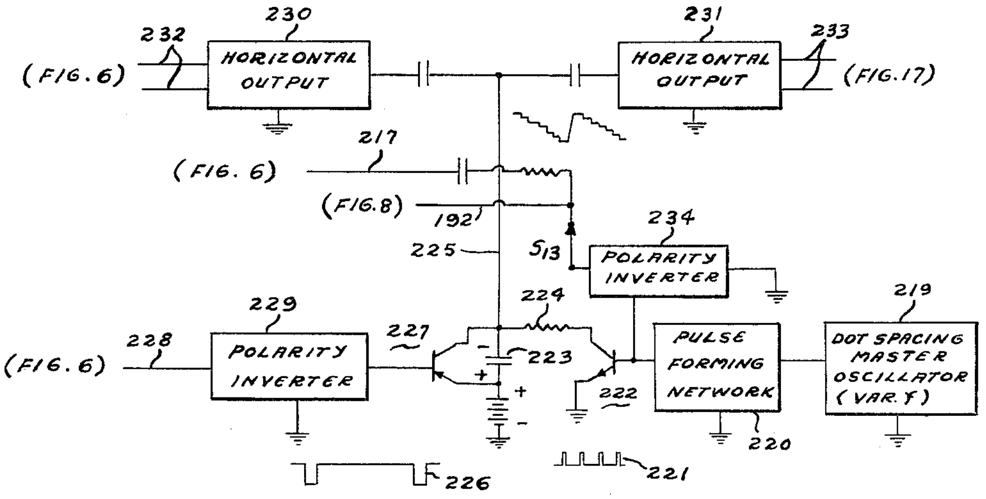
Figure 12:
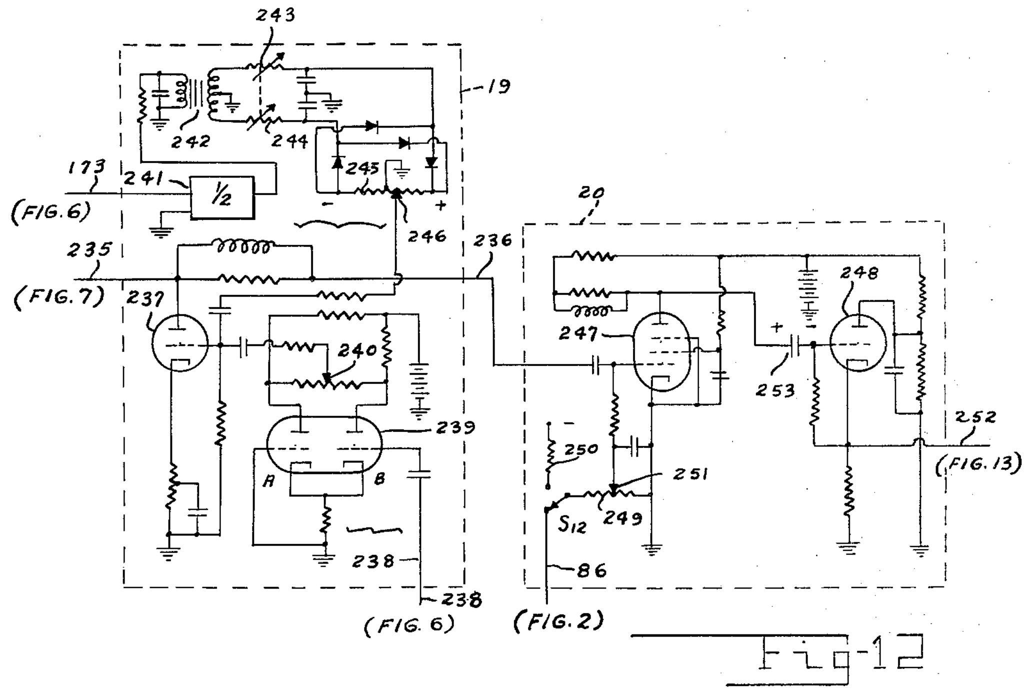
Figure 13:
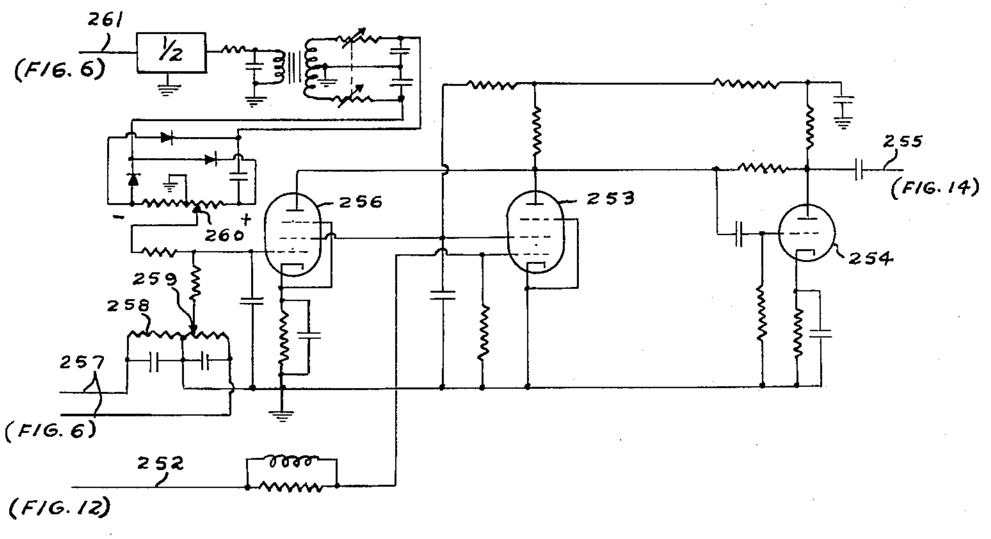
Figure 14:
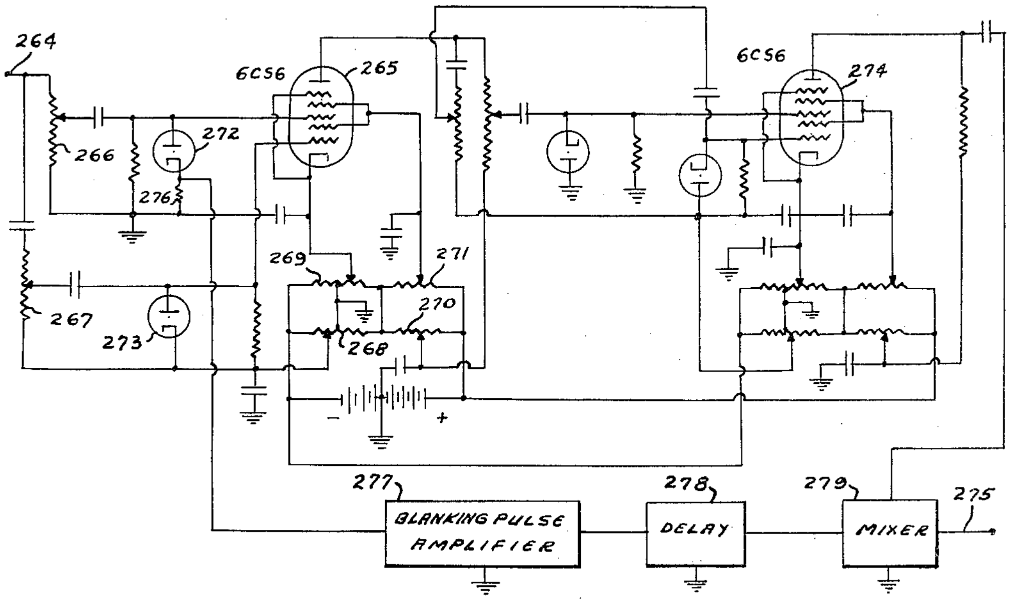
Figure 14A:
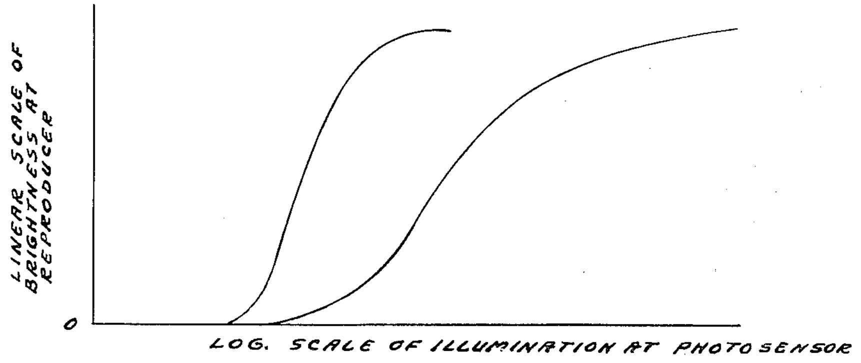
Figure 15:
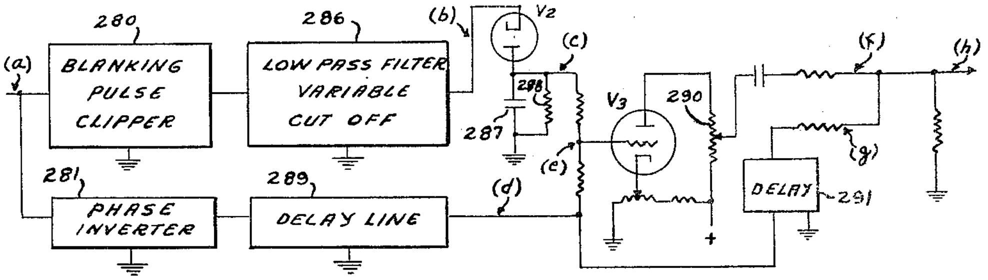
Figure 15A:
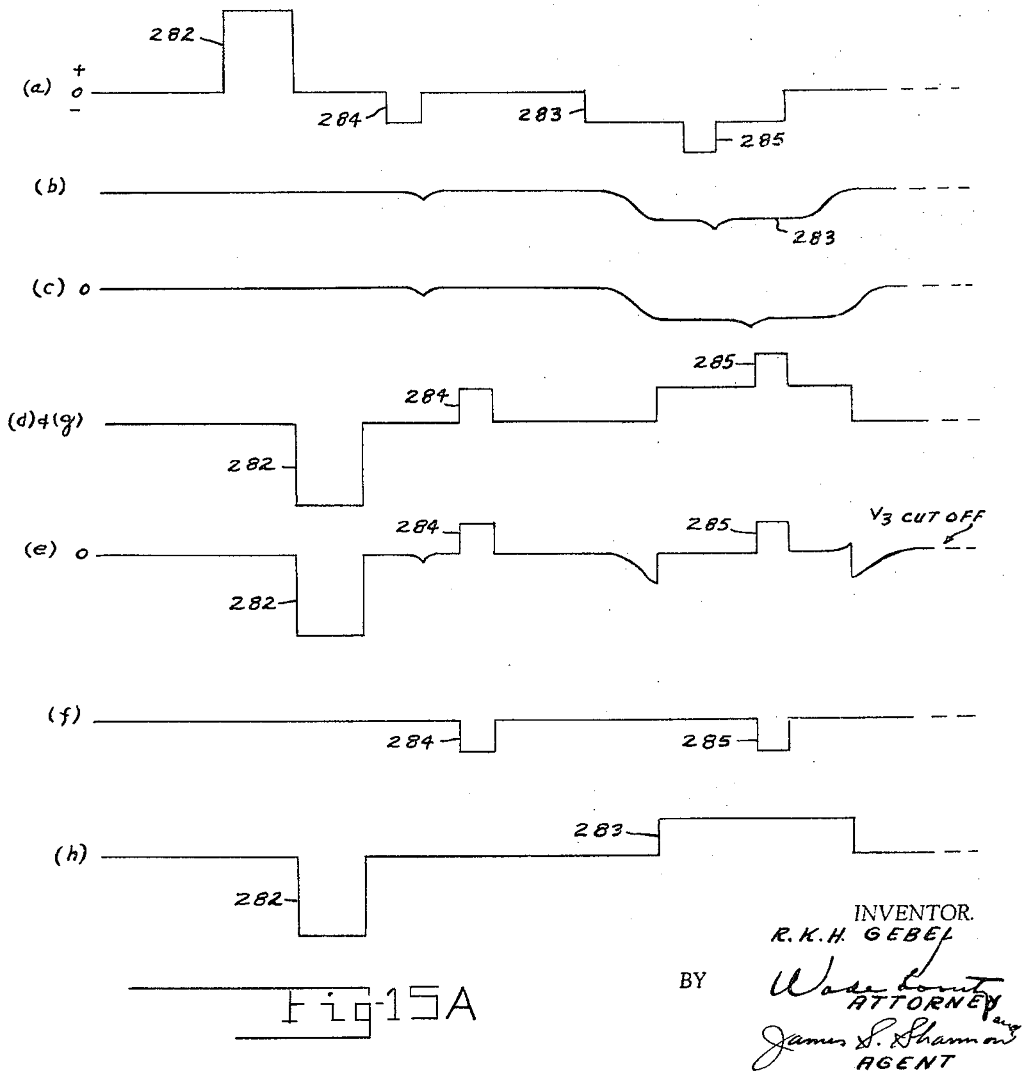
Figure 16:
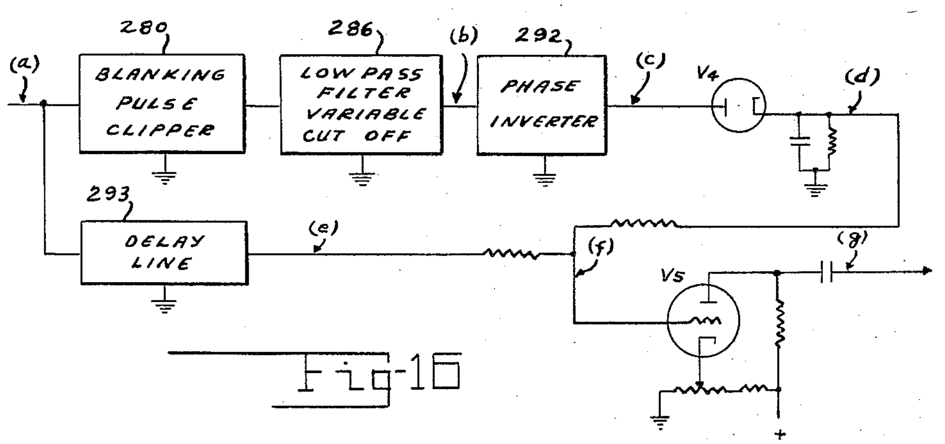
Figure 16A:
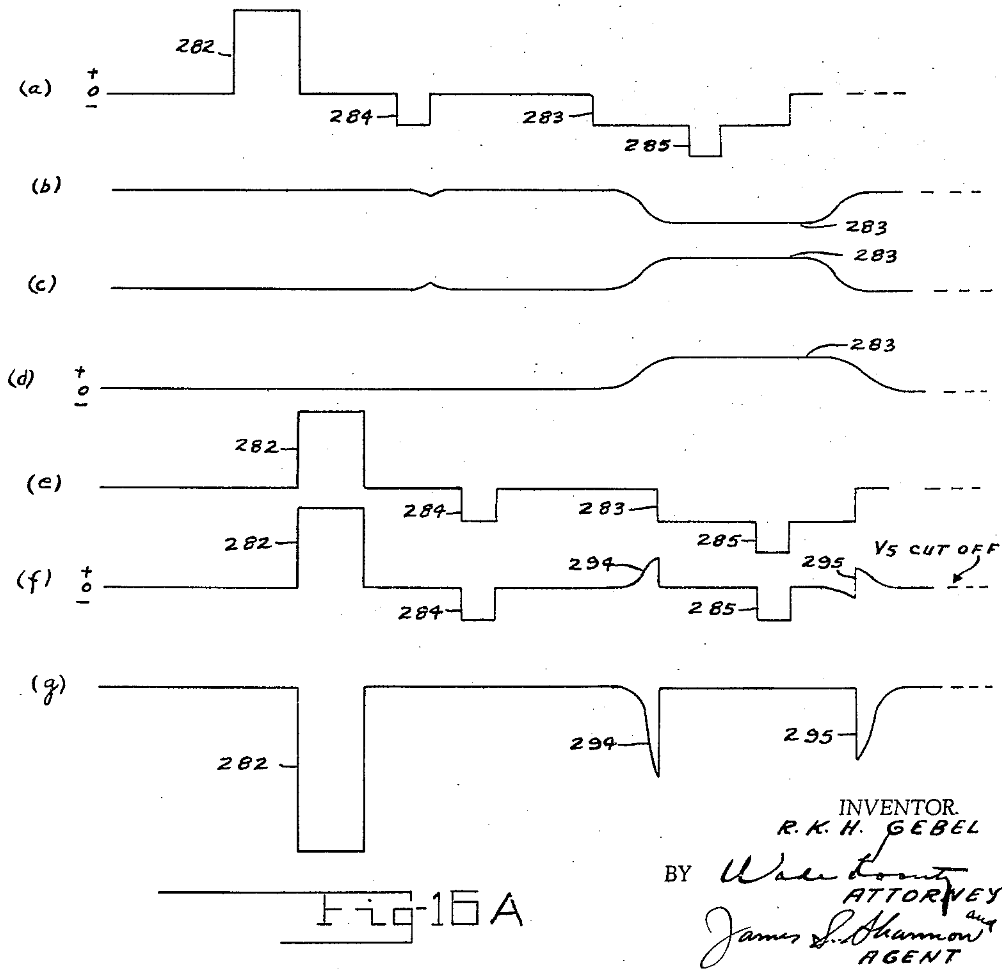
Figure 17:
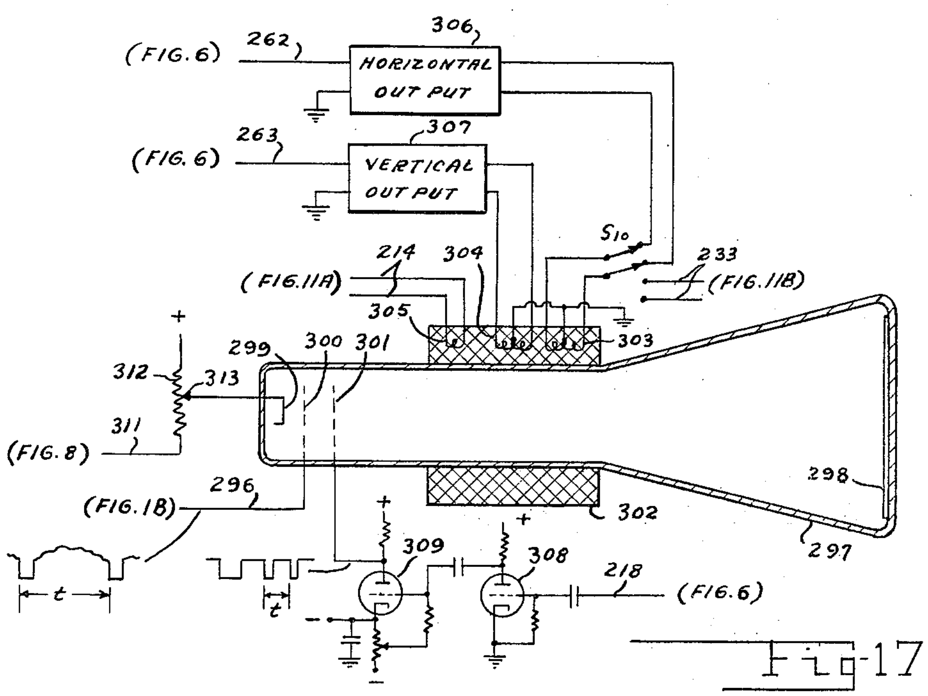
Figure 19:
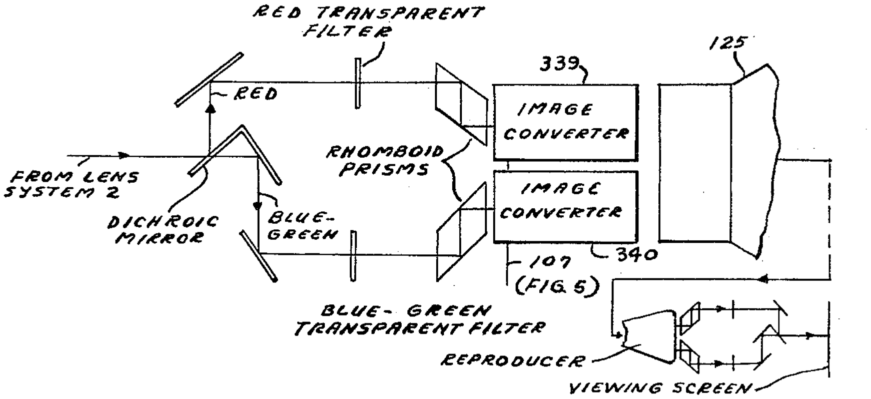
Figure 18:
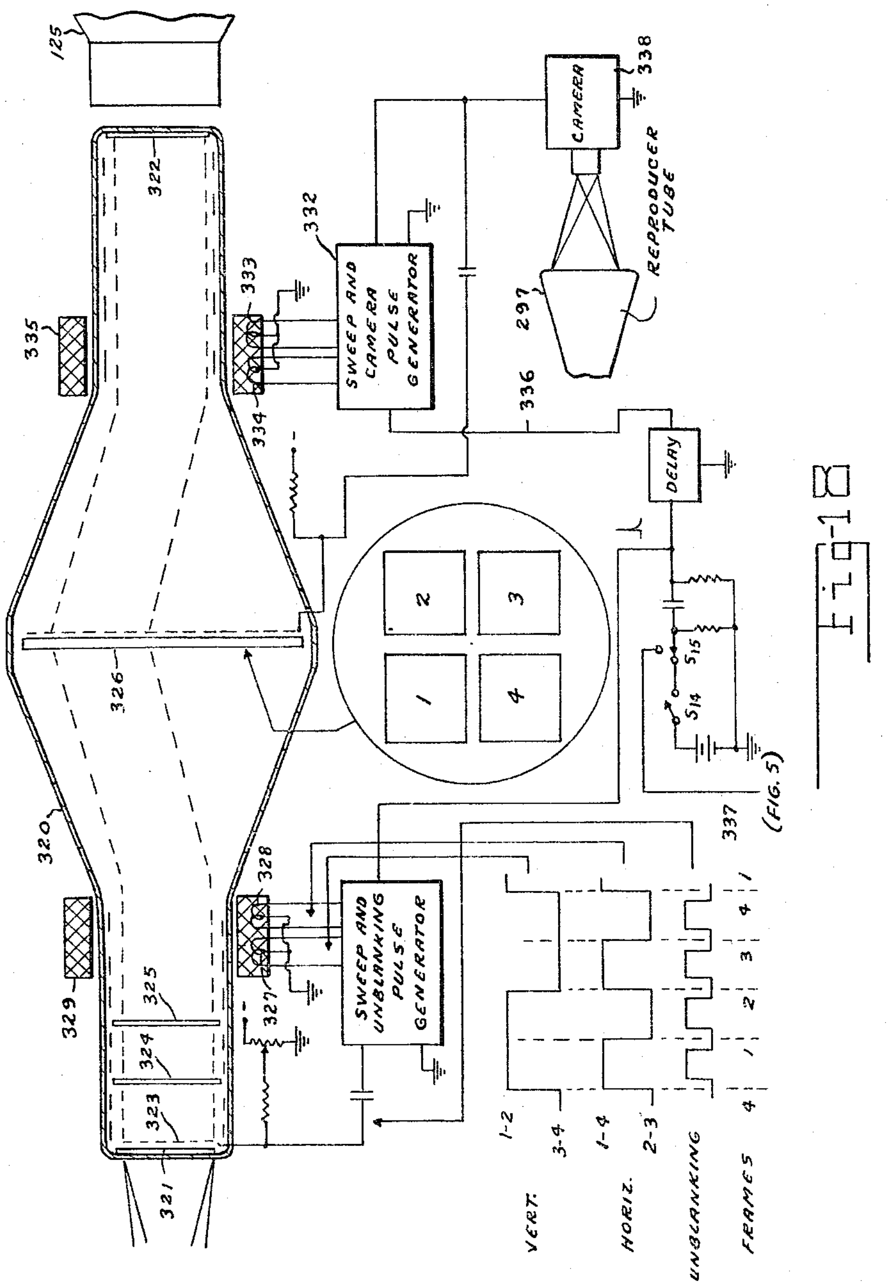

The light amplifier system will be described in more detail with reference to the specific embodiment thereof shown in the accompanying drawings, in which:

FIGS. 1A and 1B show a block diagram of the system and serve as a guide for the identification and interconnection of the specific embodiments of the various elements as shown elsewhere in the drawing, FIG. 2 illustrates the construction of the safety shutter, FIG. 3 illustrates the input optical system and one form of the image transducer, FIG. 3A illustrates the construction of an electron image intensifier, FIG. 3B illustrates the detection probability as a function of $\delta_p$, FIG. 4 illustrates a light source for illuminating the field of view where required, FIG. 5 illustrates the gating circuit with adjustable delay for use with the electronic shutter, FIG. 6 illustrates the transducer and associated horizontal and vertical sweep circuits, retrace blanking circuits and blanking pulse correcting circuits, FIG. 7 shows the preamplifier circuit and signal polarity reverser, FIGS. 8 and 8A illustrate the target sensitization circuit, FIG. 9 shows the beam feedback modulator circuit, FIG. 10 shows the circuit for target plate charge erasure and beam intensity control, FIG. 11A shows the dot interlase and beam wobble circuits, FIG. 11B shows the spot sweep scanning circuit, FIG. 12 illustrates the horizontal shading circuit, and also the amplifier gain control and direct current restorer circuits, FIG. 13 illustrates the vertical shading circuit, FIG. 14 illustrates the threshold and amplitude limiter and gamma control circuits, FIG. 14A shows characteristics obtainable with the circuit of FIG. 14, FIGS. 15 and 15A illustrate one form of the signal modifier circuit, FIGS. 16 and 16A show another form of the signal modifier circuit, FIG. 17 illustrates the reproducer, FIG. 18 illustrates a specialized form of the image converter for high speed sequential images, and FIG. 19 illustrates another specialized form of the image converter providing images in two wavelength bands.

The combination of elements constituting the sequential light amplifier system is shown by the block diagram in FIGS. 1A and 1B. This diagram also serves as a guide to the figures of the drawing illustrating specific embodiments of these elements as well as a guide to the interconnections between the various elements. A detailed description of these elements follows:

FIG. 2 shows a suitable form for the safety shutter 1 of FIG. 1A. In this arrangement one or more partially absorbing plates 70–72 are moved to a light intercepting position in front of the light amplifier optical system, depending upon the scene brightness. A light sensor 73, having an optical axis parallel to the optical axis of the light amplifier, has a lens 74 for directing light from the scene viewed by the light amplifier onto a photocell or photomultiplier 75. The output of element 75 which is a voltage proportional to scene brightness is applied to the input of a power amplifier 76 used to drive the solenoid actuated switch 77. As the scene brightness increases armature 78 is pulled downward against spring 79 energizing the contacts of switch 77 and the actuating solenoids 80, 81 and 82 for plates 70, 71 and 72 in succession. While only three absorbing plates are shown, any desired number may be employed by extending switch 77. R-C network 83–84 is coupled to the output of amplifier 76 for producing across capacitor 84 a voltage of the polarity shown that is proportional to the scene brightness. This voltage is applied over conductors 85 and 86 to subsequent apparatus in the light amplifier for purposes which will be explained later.

FIG. 3 shows the details of block 4 in FIG. 1A which is the simplest of the three disclosed image converters and intensifiers represented by block 3. The more specialized image converters and intensifiers represented by blocks 5 and 6, which may be substituted for block 4, will be described later. Referring to FIG. 3, the image converter shown comprises an evacuated envelope 87 having a transparent input end 88 at which is located a photocathode 89, and a transparent output end 90, at which is located a phosphor layer 91. The light that passes the safety shutter of FIG. 2 is focused on the photocathode 89 by a lens system 2 to form there on an optical image of the field of view of the light amplifier. This illumination of the photocathode produces an emission of electrons from the inner surface that constitutes an electron image corresponding to the optical image on the photocathode. The electrons constituting this image are accelerated toward and focused upon an electron image intensifier plate 92 under the combined effects of accelerating electrodes 93, 94 and 95 and the axial magnetic field produced by coil 96. The intensifier plate is a laminar structure such as shown in section in FIG. 3A and as also shown and described in my patent No. 2,955,188, issued October 4, 1960. This structure consists of a thin substrate 97 of a suitable transparent material such as glass or mica with a coating of phosphorescent material 98 on the side facing photocathode 89 and a coating of photoemissive material 99 on the other side. Also the phosphor 98 is coated with a thin electron pervious film such as may be made by the evaporation of a thin layer of aluminum. The electron image focused on phosphor 98 produces a corresponding optical image therein the brightness of which depends upon the kinetic energy level of the incident electrons which, in turn, depends upon the amount of acceleration experienced by the electrons in their passage through the accelerating field established between photocathode 89 and phosphor 98. Using practical values of voltage the gain in image brightness between photocathode 89 and phosphor 98, i.e., the brightness gain of a single image intensifier stage, may be, for example, 40.

The light generated in phosphor 98 passes through substrate 97 to photocathode 99. The efficiency of this transfer is increased by metallic film 100 which acts as a reflector for the backwardly directed light. This illumination of photocathode 99 by the optical image generated in phosphor 98 produces a corresponding electron image the constituent electrons of which are accelerated toward and focused upon the phosphor 98 of a second image intensifier plate 92′ identical to the first, completing a second stage of optical image intensification operating in the same manner as the first stage described above. Similarly, the photocathode of intensifier plate 92' and the output phosphor 91 operate as a third stage of optical image intensification. With an optical image intensification of 40 for each of the three stages, the output optical image at phosphor 91 is brighter than the input optical image at photocathode 89 by a factor of $6.4 \times 10^4$. This figure is given only as an example of a gain attainable at the present state of the art without serious loss of resolution in the image.

The maximum useful light amplification that can be attained by this method depends upon the conversion efficiencies of the photocathode and phosphor materials used, the practical limitations on the magnitudes of the accelerating voltages and the loss in resolution that can be tolerated.

As stated earlier, the probability of detecting an object against the background of the dark current of the photocathode, which fluctuates in a random manner and therefore has a standard deviation in either direction from its average value approximately equal to the square root of the average value, depends upon the excess of the average value of the electron image current over the average value of the dark current in comparison to the standard deviation of the dark current. This probability P is expressed in FIG. 3B as a function of $$\delta_p = \frac{I_0 - I_B}{I_B^{1/2}}$$

where $I_0$=average electron image current for object.
and $I_B$=average value of dark current.

Consequently, for a low threshold of detectability, the dark current should be made as small as possible. The main sources of dark current are thermionic emission by the photocathode, bombardment of the photocathode by positive ions, field emission, emission by phosphorescence, and feedback of stray light. The converter should be designed to minimize these factors. To minimize thermionic emission, the photocathode should be isolated as much as possible from sources of heat and may be directly cooled as described in my above-mentioned Patent 2,955,158.

FIG. 3B also gives the probability of discriminating between image elemental areas of different brightness levels. In this case $I_B$ in the above equation equals the average value of electron image current for the darker of the two areas.

Another function performed by the image converter and intensifier 4 is that of shifting the location of the optical image in the spectrum. In this respect the input photocathode 89 is made of materials sensitive to the wavelengths in the viewed scene or to the spectral region of most interest in the viewed scene, while the output phosphor 91 is designed to emit light in the spectral region to which the following image transducer, to be described later, is most sensitive. Therefore, by substituting image converters sensitive to different wavelengths, the light amplifier may be used in various regions of the spectrum.

The image converter and intensifier 4 also provides means for the minification or magnification of the image on the input photocathode 89. This is accomplished by varying the directions of the magnetic lines in the left-hand portion of the converter tube through the use of an auxiliary coil 100 and means 101 for controlling the magnitude and direction of the direct current flowing therein. Since the electrons leaving photocathode 89 follow paths defined by the magnetic lines, objects in the image on the photocathode may be magnified or minified on screen 91 by causing the magnetic lines, and therefore the electron paths to diverge or converge from the photocathode. Broken lines 101, 102 and 103 represent the areas of the photocathode imaged on screen 91 for conditions of less than unity, unity and greater than unity magnifications, respectively. The results obtained are analogous to those obtained with a lens of continuously variable focal length. Further information on this method may be found in an article entitled, "Electronic Zooming with the Image Orthicon Television Pickup Tube," by S. Miyashiro and Y. Nakayama in the Advances in Electronics and Electron Physics Series, volume 16, Photoelectrical Image Devices, Academic Press, New York and London.

Finally, the image converter provides a high speed electronic shutter in the form of a control grid 104 connected through resistor 105 to an adjustable tap on potentiometer 106 providing a negative potential relative to ground and photocathode 89. By making grid 104 sufficiently negative relative to the photocathode the electron image may be completely cut off. An exposure may then be made by applying a positive pulse of duration equal to the desired exposure time to conductor 107.

FIG. 4 shows the details of pulsed light source 7 of FIG. 1A. This light source is used when it is desirable to illuminate the field of view of the light amplifier. The light source 108 preferably supplies a pulse of light of very high intensity and very short duration so that by synchronizing the electronic shutter in the image converter with the light pulse and utilizing an adjustable delay of the shutter only objects near a selected range will be viewed. This feature is useful in reducing background light in the reproduced image. The light source may, for example, be a laser fired by the discharge of condenser 50 upon closure of a manual switch 109 or an electronic switch 110 which is used for synchronization with the vertical sweep of the transducer by means of a vertical trigger applied over conductor 52 from FIG. 6. A small amount of light emitted by source 108 is directed into photocell 111 for producing a trigger pulse on conductor 112 for the gating and delay circuits 8 shown in FIG. 5.

Referring to FIG. 5, dual triode 113 and associated network constitute a bistable circuit in which, prior to the application of a trigger pulse to conductor 112, section B is conductive and section A is cut off. Dual triode 114 and associated network constitute a monostable circuit in which in the stable state section B is conductive and section A is cut off. With triode 113B conductive the voltage across capacitor 115 is low due to the low anode voltage.

When a negative triger pulse occurs on conductor 112 the bistable circuit is instantly switched to its other stable state in which section A is conductive and section B nonconductive. The increased potential at the anode of section B now causes capacitor 115 to charge from source 116 through resistors 117 and 118 at a rate determined by the time constant RC. The voltage on the anode of nonconductive triode 114A rises exponentially as capacitor 115 charges. Eventually, at an anode votage determined by the setting of tap 119, conduction is initiated in section B of the tube 114 and a rapid transition occurs to the unstable state of the circuit in which section B is cut off and section A is conductive. In the unstable state capacitor 115 discharges through section A and resistor 120, the discharge current being at a maximum immediately after the transition and decaying thereafter. This produces a sharp positive pulse at point 121. The time interval between the leading edge of the trigger pulse on conductor 112 and the leading edge of the pulse at point 121 is determined by the capacitance of capacitor 115 and the negative bias applied to the grid of 114A as determined by the setting of tap 119.

The bistable and monostable circuits automatically return to the conditions that existed just prior to the trigger pulse on conductor 112 in the following manner: For the bistable circuit, as capacitor 115 discharges the potential of the anode of 113B and the potential of the grid of 113A which is coupled to this anode falls. As the potential of the grid 113A falls, the space current of this tube is reduced causing its anode potential to rise. This raises the 113B grid potential until eventually conduction is initiated in this section. A rapid switching action then takes place returning the bistable circuit to its initial state with section B conductive and section A nonconductive. For the monostable circuit, while in the unstable state the charging current of capacitor 122 flowing through resistor 123 decays exponentially causing an exponential decrease in the section A control grid potential. At the same time the discharge current from capacitor 115 in resistor 120 is decreasing, so that the potential of point 121 falls. Eventually, point 121 and the cathode of section B fall in potential to the point where conduction is initiated in this section. The circuit then rapidly switches back to its stable state with section B conductive and section A nonconductive.

The pulse produced at point 121 is coupled through the lower contacts of $S_1$ and the upper contacts of $S_2$ to pulse shaper and amplifier 124 which produces on conductor 107 a positive pulse having a leading edge coincident with the leading edge of the pulse at point 121. Circuit 124 also incorporates means for controlling the duration $P_L$ of the output pulse. This pulse is applied to the shutter grid 104 of FIG. 3 and controls the exposure duration.

The light amplifier may be used as a passive system without pulsed light source 7. In this case, the circuit 124 may be triggered directly from the vertical sweep circuits of the image transducer by placing $S_2$ in its lower position. For this purpose trigger pulses occurring at the vertical rate are derived from the vertical sweep circuit 12 of FIG. 6 and applied over conductor 53 to $S_2$.

The purpose of the optical coupler 9 of FIG. 1A is to transfer the optical image on the screen 91 of the image converter to the photocathode of the transducer 10 with the maximum efficiency. The coupler may be an optical fiber device or it may be a high efficiency lens system. Element 125 of FIG. 3 represents an optical coupler of the high efficiency lens system type such as may be obtained commercially, for example, from the Old Delft Optical Co., Inc., Hicksville, L.I., New York.

FIG. 6 shows the optical image to video signal transducer 10 and associated horizontal sweep circuit 11, vertical sweep circuit 12 and retrace blanking circuit 13. The transducer is shown as an image orthicon television camera tube with one intensifier stage. The image isocon camera tube may also be used and provision is made in subsequent circuits for accommodating the output video signal of either tube, as will be seen later. The construction and operation of both the image orthicon and the image isocon are well understood in the art and described in the literature, for example, in the RCA Review for June 1949 and September 1949.

The image orthicon comprises an evacuated envelope 126 containing at one end a photocathode 127, an intensifier plate 128, a target 129 and a fine mesh conductive target screen 130. The image on the output screen of the image converter is transferred to the photocathode 127 of the transducer tube by lens system 125. The photocathode converts the optical image into an electron image which is accelerated toward and focussed upon intensifier plate 128. This plate is similar to plates 92 and 92' of FIGS. 3 and 3A and operates in the same manner to intensify the electron image. The intensified image is accelerated toward and focussed upon the target 129 through the very fine mesh conductive screen 130. The target electrode is usually a thin glass membrane. It is arranged so that the image electrons impinging upon the target electrode have sufficient kinetic energy to release secondary electrons from the target in a ratio greater than unity. These secondary electrons are collected by slightly positive screen 130 leaving a positive charge distribution on the target corresponding to the electron density distribution in the electron image. This charge is readily transferred to the other side of the glass membrane because of its thinness.

To convert the picture information contained in the charge pattern into a video signal the target 129 is scanned by a constant current beam 131 of low velocity electrons derived from cathode 132. The electron velocity in the scanning beam is made to approach zero as the beam approaches the target so that at the lowest target potential very few if any electrons will land on the target. For areas of higher potential on the target sufficient electrons land to neutralize the positive charge. Thus as the beam scans the target more or less electrons land depending upon the positive charge distribution. Those electrons not required to neutralize the charge on the target return toward the cathode along path 133 and strike the first dynode 134 of an electron multiplier having second, third, fourth and fifth dynodes 135, 136, 137 and 138, respectively, and an output electrode 139. The modulation of the return beam constitutes the video signal which, after amplification in the electron multiplier, appears across load impedance 140. For optimum modulation the beam current should not be much in excess of that required to neutralize the target areas corresponding to the highlights of the scene. It is apparent that the modulation of the beam return current is opposite in phase to the light intensity variation on the photocathode. In accordance with standard practice, the tube is operated in an axial magnetic field provided by coil 141, and the scanning operation of the beam is effected by a magnetic deflection coil assembly 142 containing vertical and horizontal deflection coils indicated schematically at 143 and 144.

The image isocon camera tube is similar to the image orthicon except that, instead of using the entire return beam as the video signal, the scattered fraction alone is admitted to the electron multiplier. This mode of operation is based upon the fact that, for low electron velocity scanning, not all of the electrons constituting the return beam were specularly reflected from the target, and the fact that the number of non-specularly reflected or scattered electrons at any point on the target is proportional to the positive potential of the target at that point. By placing a shield with an aperture before the first dynode of the electron multiplier and providing a suitable electron optical system, the specularly reflected electrons are caused to strike and be collected by the shield and only the scattered electrons are permitted to enter the electron multiplier through the aperture. Since the number of scattered electrons is proportional to the positive charge on the target and hence to the intensity of the light, the current admitted to the electron multiplier in the image isocon is in phase with the light variation in the optical image, as compared with the image orthicon where it is opposite in phase. Because the weakest light flux produces the smallest video signal and because the percentage modulation of the output signal can be made very high, the beam noise contribution is less than in the image orthicon, with the result that less deterioration of the signal-to-noise ratio in the stored image occurs. However, the image isocon is electron optically more complex and more difficult to adjust than the image orthicon.

The designs for the horizontal sweep circuit 11, the vertical sweep circuit 12 and the retrace blanking circuits 13 may follow known camera tube practice. Suitable designs are shown in FIG. 6. Referring to the horizontal circuit 11, the oscillator incorporating tube 145 serves as the master oscillator for the scanning system. In the embodiment shown, this oscillator operates at a horizontal scanning frequency of 4500 c./s. Due to the self-biasing of the gride of tube 145 beyond cutoff sharp negative pulses at the horizontal frequency are developed across resistor 147 which drive tube 148 into cutoff, producing positive-going rectangular pulses on its anode. These pulses, which define the horizontal retrace time, are applied to the grid of tube 149. This tube, due to the self-biasing of its grid, conducts only for the pulse duration and serves to discharge condenser 150, forming the retrace portion of the sawtooth sweep voltage developed across this condenser. Between pulses, the sweep portion of the sawtooth is developed by the charging of condenser 150 through resistors 151 and 152.

This sawtooth of voltage is applied to the input of horizontal output circuit 153 which operates to produce a corresponding sawtooth of current in horizontal deflection coil 144.

The vertical sweep circuit 12 comprises a capacitor 154 which periodically charges through resistors 155 and 156 to form the sweep portion of the vertical sawtooth, and periodically discharges through section B of tube 157 to form the retrace portion. Tube 157 and associated circuit constitute a free running multivibrator synchronized with the horizontal oscillator 145 at 1/225 the horizontal frequency, or 20 c./s. To effect this synchronization the waveform in the output of tube 148 of the horizontal circuit is differentiated and its negative portions removed by elements 158, 159 and 160. The resulting series of positive pulses is then inverted in phase to produce a series of sharp negative pulses at the horizontal sweep rate. This series of pulses is applied to a cascade of frequency dividers 161 which produces a series of negative pulses occurring at a rate of 20 per second, the vertical sweep frequency. The latter pulses are applied to the grid of section A of tube 157 to synchronize this multivibrator. The voltage developed across capacitor 154 is applied to the grid of tube 162 which through transformer 163 drives the vertical sweep coil 143 of the transducer.

The retrace blanking circuits 13 have vertical and horizontal sections shown in FIG. 6. In the vertical section, positive pulses, having sharp leading edges coincident with the leading edges of the synchronizing pulses applied to the grid of tube 157A and exponentially decaying trailing edges, are derived from the cathodes of tube 157 by differentiating circuit 164–165, the negative portions being removed by diode 166. These pulses are amplified in stage 167, amplified and their upper portions clipped in stage 168, amplified and their lower portions clipped at the desired pulse width in stage 169 which has an adjustable bias for width control, and amplified and their upper portions clipped in stage 170 to produce positive-going rectangular pulses of the proper vertical retrace blanking width on the grid of section A of mixer stage 171.

The horizontal retrace blanking pulses are derived from upper rectangular portions of the waveforms on conductor 172 in the horizontal sweep circuit. Since less wave shaping is required in this case the horizontal retrace blanking circuit may be simpler than the vertical circuit and may consist of two stages 169′ and 170′ similar to stages 169 and 170 of the vertical circuit. By suitable adjustment of its bias, the stage 169′ removes the lower portion of the waveform leaving only the desired rectangular portion. This part is amplified and its upper portion clipped by the stage 170′ so that a positive-going rectangular pulse is produced on the grid of section B of mixing tube 171. The resulting composite signal of negative-going vertical and horizontal retrace blanking pulses appearing on conductor 174 are applied to the beam intensity control electrode 175 of the transducer tube to blank the beam during the vertical and horizontal retraces.

Since the retrace blanking pulses cut the scanning beam completely off there is no current in resistor 140 during these pulses and the potential on output conductor 176 is at its highest value. Therefore, in the presence of a video signal output on conductor 176 the blanking pulses appear as positive-going rectangular pulses for both the image orthicon and the image isocon. It is desirable that the blanking pulses in the video signal correspond to "black." In the case of the isocon tube this requirement is satisfied since in this case the video signal voltage on conductor 176 is greatest for a completely dark situation. In the case of the image orthicon, however, the maximum video signal voltage on conductor 176 represents maximum brightness to the blanking pulses are in the "white" region. In order to correct this situation for the image orthicon, the composite blanking pulses on conductor 174 are applied over conductor 65 to tube 66 where they are reversed in polarity and applied through the "O" or orthicon contacts of $S_{11}$ to the control grid of tube 67 which is normally biased to cut off. The positive-going pulses on this grid cause tube 67 to conduct heavily through resistor 140 lowering the potential of conductor 176 into the "black" region, thereby providing the video signal with horizontal and vertical blanking pulses in the "black" as required.

In addition to the vertical and horizontal blanking pulses applied to electrode 175 over conductor 174, negative-going dot interlace blanking pulses or spot sweep blanking pulses are also applied to electrode 175 over conductor 217 from FIG. 11A or 11B, to be explained later. These pulses are also applied over conductor 65 to tube 66 and, when $S_{11}$ is in its "O" position, reduce the potential of conductor 176 in the same manner as the vertical and horizontal retrace blanking pulses.

When an image isocon is used as the transducer, $S_{11}$ is placed in its "I" position. This prevents the application of pulses to the grid of tube 67 which remains in cut-off with no effect on the potential of the video output conductor 176.

The preamplifier shown in FIG. 7 provides a mode selector for effecting a change in signal polarity so that transducers giving video signals of either polarity may be used. Referring to this figure, the video output from FIG. 6 is applied to the grid of section A of tube 177 which acts as a cathode follower. With $S_3$ in the position shown, section B is energized but tube 178 is disabled by the removal of its screen voltage. Since sections A and B of tube 177 are so connected in cascade as to produce no phase change, the signal on conductor 179 has the same phase as that on conductor 176. However, with $S_3$ in its right-hand position, section B is disabled by removal of its anode voltage so that the signal on the cathode of section A is applied directly to the grid of tube 178. This tube, which is now operative due to its restored screen voltage, introduces a phase reversal of the signal so that the signal on conductor 179 is opposite in phase to that on conductor 176. The designs of the circuits following FIG. 7 are based on a video signal on conductor 179 that is in phase with the brightness, i.e., an increase in brightness causes an increase in the video signal in the positive direction. The blanking pulses are therefore negative-going at this point. This requires that $S_3$ be in the position shown for the image orthicon and in the polarity reversing position for the image isocon.

The target sensitization circuit of FIG. 8 increases the ability of the transducer tube to produce a usable video signal from very low light levels. The target-screen assembly 129–130 of the transducer tube (FIG. 6) acts with the thermionic cathode 132 as a diode having a very high load resistance. As a result, the target plate 129 charges to a potential of about 1.5 volts negative relative to the cathode when no light is present on the photocathode 127. With a scene of low brightness, various elements on the target may obtain negative potentials in this manner ranging down to about −1.5 volts for an elemental area corresponding to a completely dark element in the scene. Under this condition a weak light area in the optical image may never produce enough secondary emission from the target to bring the corresponding area of the target from its negative bias potential far enough into the positive to produce a sufficient beam modulation factor for a detectable signal to noise ratio. This circuit permits the target to be subjected to the electron image for several frames without scanning so that the target can reach as high a positive potential as possible. The entire target is then raised in potential for one frame by about 1.5 volts to overcome the effect of the negative bias while the stored information is removed by scanning.

Referring to FIG. 8, dual triode 181 and its associated circuit constitute a multivibrator acting as a frequency divider with a ratio of, for example, 5:1. Positive trigger pulses of vertical scan frequency derived from the vertical sweep circuit 12 of FIG. 6 are applied over conductor 180 to the grid of phase inverter tube 182. The negative-going pulses at the anode of this tube are applied to the grid of section A of tube 181 as input pulses to the divider, which produces one positive output pulse across resistor 183 for each fifth input pulse. The positive-going pulses on the cathode of tube 182 are applied to the grid of section A of tube 183, which is incorporated in a bistable multivibrator circuit. Consequently, a pulse occurs on the grid of section B coincidentally with each fifth pulse on the grid of section A. Assuming section A to be conducting and section B cut off, subsequent positive pulses on the grid of section A will have no effect on the circuit since this section is already fully conductive. Therefore, no change occurs in the circuit until a pulse occurs on the grid of section B. This switches the circuit to its other stable state in which A is cut off and B fully conductive. However, the circuit remains in this state for only one frame or vertical scan interval since the next pulse on section A switches the circuit back to the initial state where it remains for another five pulses on the grid of section A.

As seen from the above description, a complete cycle of operation of the circuit of tube 183 results at the anode of section A, in a negative-going pulse of five vertical scan intervals duration followed by a positive-going pulse of one vertical scan interval duration and, at the anode of section B, in a positive-going pulse of five vertical scan intervals duration followed by a negative-going pulse of one vertical scan interval duration. The positive-going pulse of five vertical scan intervals duration on the anode of section B is applied to the grid of tube 184 causing this tube to draw current which flows by way of conductor 185 through resistor 186 (FIG. 9) to ground, raising the potential of the upper end of this resistor. Since the cathode 175 of the image transducer 10 (FIG. 6) is connected by conductor 187 to the upper end of this resistor, the cathode potential is raised cutting off the beam current for five vertical scans. This increases the charge buildup time of the target by a factor of five over normal operation.

At the end of the above pulse tube 184 ceases to draw current and the scanning beam is again turned on. At the same instant the positive-going pulse of one scan interval duration at the section A anode is applied to the control grid of section A of tube 188 which couples this pulse without polarity change to the target screen 130 of the transducer 10 (FIG. 6) over conductor 189. This pulse is of such magnitude as to raise the potential of the target 129 by about 1.5 volts to compensate for the negative potential of approximately 1.5 volts which the target areas representating dark areas of the scene receive from the scanning beam, as described above.

This potential is applied to the target through what is in effect a potential divider made up of the capacitance between the screen 130 and the target 129 and the capacitance between the target 129 and ground with the latter capacitance shunted by two resistances, one a very high resistance representing the leakage resistance between the target and ground and the other a resistance representing the resistance provided between target and ground by the scanning beam. The resistance to ground by way of the scanning beam is variable and depends upon the charge on the target, i.e., the brightness of the scene. For bright scenes this resistance is low and the time constant of the screen-target capacitance charging circuit is so short that full charge is attained almost immediately when the sensitization pulse is applied to the screen. Consequently, for relatively bright scenes where target sensitization is not needed, there is no significant effect on target potential. For very low light level scenes, however, where as explained above the target becomes negative, the beam resistance becomes very high and the time constant becomes long relative to a vertical scan interval. As the result of the long time constant, the target potential is raised throughout the scanning interval.

Although the target potential is raised throughout the interval, its potential will fall from its value at the start of the interval at a rate depending upon the time constant. This is undesirable since it causes the ability of the beam to read off small charges to decrease during the scanning interval. To counteract this effect the charging time is reduced to an absolute minimum by reducing the pulse applied to the target screen 130 to zero when the beam is blanked, i.e., during the horizontal retrace intervals and during the dot interlace or spot sweep blanking intervals to be explained later. Accordingly, positive-going pulses coincident with the horizontal retrace blanking pulses are derived from the horizontal retrace blanking portion of the retrace blanking circuit 13 (FIG. 6) and applied over conductor 190 to the control grid of tube 191. Also negative-going blanking pulses are derived from the circuit of FIG. 11A or 11B over conductor 192 and applied to the cathode of tube 191. The effect in each case is to lower the potential of the anode in section A of tube 188 sufficiently to reduce the pulse on conductor 189 to substantially zero for the duration of each blanking pulse. This arrests the charging of the screen-target capacitance at all times except when the beam is actually taking information from the target and reduces the fall of target potential from this cause to a minimum.

The operation of the target sensitization circuit is illustrated in FIG. 8A. Graph *a* shows the frame sequence, in which charge accumulation occurs during frames 1–5 with readout during each fifth frame. Graph *b* illustrates the manner in which the chopped sensitization pulse applied to target screen 130 raises the target to zero potential so that its weak charge distribution can be read by the scanning beam. Graph *c* illustrates the operating cycle when a storage type reproducer is used to display the video signal during target sensitization of the transducer. When target sensitization is unnecessary the transducer may be returned to normal operation by opening $S_4$.

The beam feedback modulator circuit of FIG. 9 contributes to the ability of the light amplifier to display shadow detail in the presence of strong highlight areas in the scene, thus increasing the brightness range. In order to reduce the scanning beam noise contribution and thereby to improve the signal-to-noise ratio of the transducer output signal, the scanning beam current should be no greater than is required to neutralize the maximum elemental charge on the target. However, in the case of a scene having a wide brightness range with the detail of interest in the area of low brightness level a scanning beam with sufficient current to neutralize the positive charge on the target in the bright areas would be too great to provide a good signal-to-noise ratio in the low level areas of interest. On the other hand, if the beam current is reduced to the optimum for low level detail the charges in the high brightness areas are not completely neutralized and therefore increase from frame to frame, eventually spreading over the target and obliterating the desired low level detail. The circuit of FIG. 9 permits the beam current to be set at the proper low value to give the best signal-to-noise ratio in the low level areas and automatically raises the beam current in the high level areas to a value sufficient to achieve complete charge neutralization. An example of a situation where beam feedback modulation is useful is in viewing or photographing a planet and its satellites.

The operation of FIG. 9 is as follows: The video signal from the preamplifier and mode selector of FIG. 7 is applied over conductor 193 to the control grid of tube 194 which with its associated circuit operates as a threshold limiter. This limiter has no output except during the time that the signal on the grid exceeds the threshold, the value of which may be set by adjustable taps 195 and 196 that control the grid-cathode bias and screen grid potentials, respectively. Therefore, when the video signal, which is in phase with the scene brightness and is clamped to ground by diode 197, exceeds the preset threshold there is an output which after amplification and shaping in element 198 is applied as a negative-going pulse to the grid of tube 199. The action of this pulse is to reduce the current flow from tube 199 in resistor 186 and to lower the potential of conductor 187. Since the thermionic cathode 132 of the transducer (FIG. 6) is directly connected to this conductor its potential is lowered and the scanning beam current thereby increased. When not required, the action of the circuit of FIG. 9 can be stopped and the transducer returned to normal operation with a constant beam current by closing $S_5$.

The target plate charge eraser and beam intensity control of FIG. 10 is also directed to the problem of incomplete charge neutralization in high brightness areas when operating with a reduced beam current to provide an improved signal-to-noise ratio for the low brightness information. It is normally used as a supplement to FIG. 9 to remove any accumulation of charge that might result from the inability of the feedback circuit to achieve complete charge neutralization. The method of FIG. 10 is to directly relate the beam current to the average scene brightness and to permit any unneutralized charge in the brighter highlight areas to accumulate for several frames, after which the beam current is raised for a single frame to a value high enough to completely discharge the target plate. The process repeats continuously with the result that no serious spreading or halation effect occurs in the brightest areas.

Referring to FIG. 10, positive trigger pulses of the vertical scanning frequency derived from the vertical scanning circuit 12 of FIG. 6 are applied over conductor 200 to the control grid of tube 182'. The operation of this tube, tube 181' and tube 183' and their associated circuits is identical to the already explained operation of tubes 181, 182 and 183 in FIG. 8. Thus the circuit of tube 181' acts as a frequency divider producing a pulse on conductor 201 coincidentally with each $n^{th}$ pulse on conductor 202. As explained for FIG. 8, this results in a waveform on the anode of section A of tube 183' consisting of a negative-going pulse of $(n-1)$ frames duration followed by a positive-going pulse of one frame duration. The waveform at the anode of section A of tube 183' is applied to the control grid of section A of tube 203, causing the current flow through this section and through resistors 204 and 205 to ground to increase during the one frame positive-going portion of the waveform. This causes the cathode of section A to rise in potential and this increase is coupled over conductor 206 to a potentiometer 207–208 (FIG. 6) and thence to the beam intensity control electrode 175 of the transducer, causing an increase in beam current. At the same time the beam current is made a direct function of the average scene brightness by applying the negative voltage across capacitor 84 (FIG. 2) over conductor 85 and by way of level control potentiometer 209 to the grid of section B of tube 203. Consequently, as the average scene brightness increases or decreases the corresponding change in anode potential of section B is coupled across resistor 210 to the grid of section A causing the beam current of the transducer to increase or decrease in direct relation to the average scene brightness. The two functions of charge erasure and beam intensity control may be used together or separately, or both may be eliminated, by means of $S_6$ and $S_7$. Closure of $S_7$ holds the anode of section A of tube 183' at its lowest potential value by preventing the triggering of section B to its conductive state.

The specialized scanning waveform generators 18 may be constructed as shown in either FIG. 11A or FIG. 11B. The system in FIG. 11A combines dot interlace scanning and wobbling of a sharply focused electron beam. This results in improved resolution, a reduction in flicker and an increased sensitivity due to the doubling of the target charge storage time. The increased sensitivity makes this system particularly useful at low light levels. The system of FIG. 11B uses, instead of a wobbled finely focused scanning spot, a slightly defocussed spot of increased area. This spot scans in a horizontal direction by a series of alternate pauses and rapid displacements approximately equal to the beam diameter. In addition to an improvement in resolution this method is capable of reading twice as much information in a given period as the dot interlace system. However, it does not have the increased sensitivity that results from the increased storage time in the interlace system.

Referring to FIG. 11A the wobble generator 211 may be any suitable circuit for generating a sine or sawtooth current which flows over conductor 212 to a separate vertical deflection coil 213 in yoke 142 (FIG. 6). A similar current flows over conductors 214 to a similar vertical deflection coil of the reproducer, to be described later. These currents cause a small vertical oscillation at high frequency of the transducer and reproducer scanning beams. Negative pulses of the horizontal scanning frequency, 4500 c./s. are derived from the horizontal scanning circuit 11 of FIG. 6 over conductor 146. These pulses are used to generate the dot interlace frequency by a suitable multiplication, in this case a multiplication of 187.5, achieved by a cascade of one divider and four multipliers as shown. The output of the multiplier cascade which has a frequency of 187.5 x 4500 c./s. is used to synchronize the dot interlace oscillator 215 at this frequency. The oscillator output is shaped by pulse forming network 216 into rectangular negative-going blanking pulses which are applied over conductor 217 to the beam intensity control electrode 175 of the transducer (FIG. 6) and thence over conductor 218 to the reproducer, to be described later, for blanking their beams at the dot interlace frequency. These blanking pulses are also applied over conductor 192 to FIG. 8 for purposes already explained. The circuit may be rendered inoperative by opening switches $S_8$ and $S_9$.

The circuit of FIG. 11B generates a stepped horizontal sweep for both the transducer 10 and the reproducer. In this system, as stated above, the scanning beam covers a horizontal line by means of a series of contiguous stationary positions. The beam is moved from each position to the next adjacent position by a rapid horizontal motion over a distance approximately equal to the scanning spot diameter. The number of positions depends upon the spot size and the length of a horizontal line. The operation of the circuit is as follows: A variable frequency oscillator 219 and a variable duration pulse forming network 220 produce a series of short duration positive-going rectangular pulses 221. These pulses are applied to the base of normally nonconductive transistor 222 causing this transistor to conduct and allow capacitor 223 to charge for the duration of the pulse through resistor 224 and the collector-emitter circuit of the transistor. In this manner pulses 221 produce a series of equal increments of charge in capacitor 223 which result in a step function of voltage on conductor 225. The size of condenser 223, the valve of resistor 224, and the frequency and duration of pulses 221 are determined by the scanning spot size relative to the length of the horizontal line and the horizontal scanning frequency. These parameters are so selected as to produce stationary scanning spot positions along the horizontal line in touching or slightly overlapping relationship. During the horizontal retrace time a negative-going pulse 226 is applied to the base of transistor 227 which permits capacitor 223 to completely discharge through the emitter-collector circuit of this transistor. The process then repeats for the next horizontal line. The pulses 226 are derived from the retrace blanking circuit 137 (FIG. 6) over conductor 228 and are reversed in polarity as required by element 229. The voltage step function on conductor 225 is applied to the inputs of horizontal output circuits 230 and 231. Circuit 230 is coupled to horizontal deflection coil 144 of the transducer (FIG. 6) over conductors 232 with $S_{10}$ in its lower position. In similar manner the horizontal output circuit 231 is coupled to the horizontal deflection coil of the reproducer (FIG. 17) over conductor 233. Circuits 230 and 231 are designed as required to produce a linear relation between the current in the deflection coil and the voltage step function on conductor 225. In order to blank the scanning beams in the transducer and reproducer the pulses 221 are reversed in polarity by element 234 and applied over conductor 217 to the beam intensity control electrode 175 of the transducer 10 (FIG. 6) and also over conductor 218 (FIG. 6) to the reproducer. They are also applied over conductor 192 to FIG. 8 for reasons already explained.

The purpose of the horizontal shading circuit 19 is to compensate for certain spurious variations in the video signal. For example, the average intensity of the video signal may increase or decrease during each horizontal sweep because of a variation in background brightness. Another example of a spurious variation is the variation in the video signal due to nonuniformity of the photocathode. Present evaporative processes for producing photocathodes do not always result in a uniform photon efficiency over the surface but in a photon efficiency that may increase or decrease from the center outward, resulting in an increasing or decreasing average value of video signal in both directions from the center of the horizontal scanning line. The details of element 19 are shown in FIG. 12. The video signal passes directly through element 19, entering on conductor 235 from FIG. 7 and leaving over conductor 236. Triode 237 is connected in shunt to conductor 235 so that its anode impedance controls the video signal amplitude thereon by controlling the load impedance and anode voltage on pentode 178 (FIG. 7) when $S_3$ is in the right-hand position or by controlling the load impedance on section B of tube 177 (FIG. 7) when $S_3$ is in its left-hand position and tube 178 is inoperative.

The manner in which the anode impedance of tube 237 varies during a horizontal scanning line is controlled by the waveform on its control grid. To compensate for an approximately linear spurious signal variation along the line a sawtooth of voltage, derived from the horizontal scanning circuit 11 (FIG. 6) over conductor 238, is applied to the control grid of section B of tube 239. Section A of this tube acts as a phase inverter so that its anode potential varies oppositely to that of section B. Consequently there is a sawtooth of voltage between adjustable tap 240 and ground the amplitude of which is proportional to the displacement of the tap from the center position, where the voltage is zero, and the phase of which is dependent upon the direction of the displacement from center. This voltage is applied to the grid of tube 237 to control its anode impedance and the video signal amplitude, as described above. To compensate for a spurious variation of the video signal due to photocathode nonuniformity, mentioned above, a full wave rectified variable amplitude sine wave of either polarity having a half period equal to the horizontal scanning period and adjustable in phase relative to the scanning period is applied to the grid of tube 237. To produce this waveform an approximately triangular wave of one-half the horizontal scanning frequency is derived from a ½ divider multivibrator 241, which receives its horizontal frequency input from conductor 173 in FIG. 6, and applied to the primary of transformer 242 which is tuned to one-half the horizontal frequency. This results in an approximately sinusoidal wave of voltage across the secondary of this transformer. A phase shifting network including phase shift adjusting resistors 243 and 244 couples this sine wave to a full wave rectifier the output of which appears across resistor 245. Therefore, adjustable tap 246 on this resistor has between it and ground a series of half cycles each of horizontal scan duration. The amplitude of these half cycles is proportional to the displacement of the tap from the grounded center of the resistor 245, their polarity is determined by the direction of the displacement from center and their phase relative to the horizontal scanning cycles may be adjusted by resistors 243 and 244. The waveform at tap 246 is applied to the grid of tube 237.

In the gain control and direct current restorer circuit 20, also shown in FIG. 12, tube 247 acts as a variable gain stage and tube 248 as a combined D.C. restorer and cathode follower output stage. The video signal on conductor 236 is applied to the control grid of tube 247 the amplification of which depends upon its grid bias. For manual control of the amplification $S_{12}$ is placed in its upper position connecting resistor 249 through resistor 250 to a point of negative potential. The gain is then determined entirely by the position of tap 251. In order to adjust the gain automatically in inverse relation to the average scene brightness, $S_{12}$ is placed in its lower position. This applies the voltage across capacitor 84 (FIG. 2) over conductor 86 to the resistor 249. In this case, the position of tap 249 determines the sensitivity of the gain control circuit. The video output of tube 247 is applied to the control grid of tube 248. The effect of this stage is to establish all of the taps of the blanking pulses in the video signal outgoing on conductor 252 at the same potential above ground. Because of the phase reversal produced by tube 247 the blanking pulses in its output circuit are positive-going. Since the grid of tube 248 is not biased relative to the cathode, any tendency for the grid potential to rise above the cathode results in grid current and the charging of capacitor 253 in the direction shown. This effectively prevents any one blanking pulse from producing a higher potential on conductor 252 than any other and thus realigns all blanking pulses at the same potential above ground.

The vertical shading circuit 21, the details of a suitable embodiment of which are shown in FIG. 13, performs the same function for the vertical sweep that the horizontal shading circuit 19 of FIG. 12 performs for the horizontal sweep. In FIG. 13, the video signal from element 20 (FIG. 12) is applied over conductor 252 to the control grid of pentode 253. The video output of this stage is applied to the input of a negative feedback stabilized video amplifier stage incorporating triode 254, the amplified output appearing on conductor 255. The amplification of tube 253 is controlled by controlling its anode potential and load impedance as a function of the control grid potential of pentode 256. For this purpose, provision is made to apply to this grid a sawtooth voltage and a half cycle sinusoidal voltage as applied to the control grid of tube 237 in FIG. 12, except that the periods of these voltages are equal to the vertical scanning period rather than the horizontal period. The sawtooth voltage is derived from the vertical scanning circuit 12 (FIG. 6) and is applied over conductors 257 to resistor 258, from which it is applied to the control grid through tap 259, the amplitude of the sawtooth on the grid being determined by the displacement of the tap from the grounded center point of the resistor and the polarity being determined by the direction of the displacement. The sinusoidal half cycle is applied to the control grid through tap 260. This waveform is derived in exactly the same manner as already described for the horizontal shading circuit in FIG. 12. The vertical scanning rate is derived from the vertical sweep circuit 12 (FIG. 6) and is applied over conductor 261 to the ½ divider.

The video signal leaving the vertical shading circuit is subjected to threshold and amplitude limitation in suitable circuits for this purpose represented by block 22. Threshold limitation permits suppression of signals below an arbitrarily determined intensity and thereby provides static suppression of the background and inherent noise. Amplitude limitation permits not only clipping of the signals caused by bright objects but also clipping of the noise riding on top of the information signal, as may occur at low light levels. Any suitable limiters of known types may be used for these purposes, such as biased diodes or biased grid controlled vacuum tubes.

After being subjected to threshold and amplitude limitation as desired, the video signal is applied over conductor 264 to gamma control circuit 23. The purpose of this circuit is to provide a means for adjusting the slope and the configuration of the curve relating the output signal of this circuit to its input signal and thereby to control the relationship between brightness at the reproducer and brightness at the input photosensor of the light amplifier. A suitable circuit for this purpose is shown in FIG. 14. Referring to this figure, the video signal on conductor 264 is applied to the first and third grids of a pentagrid amplifier 265, such as the 6CS6, through level adjusting potentiometers 266 and 267. Potentiometers 268 and 269 are provided for adjusting the biases of the first and third grids, respectively, while potentiometer 270 controls the anode potential and potentiometer 271 the common potential of the second and fourth grids. Diodes 272 and 273 are clamping devices for direct current restoration. The second stage built around a second pentagrid amplifier 274 is identical to the first but with the clamping diodes reversed in polarity. The circuit shown is described for positive-going blanking pulses on input conductor 264. This will be the case if there is no phase reversal in circuit 22. However, if circuit 22 is so designed as to introduce a polarity reversal, then either a phase inverter should be added to restore the signal polarity to that in the output of circuit 21 or else all of the clamping diodes in FIG. 14 should have their polarities reversed.

By proper adjustment of the various controls in FIG. 14 the signal magnitudes and the working points of the control grids may be so selected as to provide a wide variety of non-linear relationships between input signal magnitude and output signal magnitude. In this way a non-linear relationship may be established between the illumination at the input photocathode 89 (FIG. 3) and brightness at the reproducer (FIG. 17), as required to fit the brightness range at the photocathode to the brightness range of the reproducer or to establish almost any desired relationship between these ranges. FIG. 14A illustrates, as examples, two possible non-linear relationships between the photocathode illumination and reproducer brightness, as established by the gamma control.

Since the polarity of the blanking pulse is opposite to that of the information portion of the video signal in the described system, the blanking pulses may be clipped or badly distorted by the gamma control circuit. In order to restore the blanking pulse in the output signal on conductor 275, the incoming blanking pulses, which appear across a small resistor 276 in series with diode 272, are amplified by amplifier 277, delayed by element 278 by an amount equal to the delay in the gamma control circuit, and combined with the output of the gamma control circuit in mixer 279.

The video signal at the output of gamma control circuit 23 is next passed through a bandpass filter 24 having adjustable lower and upper cutoff frequencies. Certain spurious signal components may be removed in this manner. For example, no signal having a fundamental frequency below the lower cutoff will be passed, thus eliminating a great amount of low frequency noise. By making the lower cutoff relatively high, the greater portion of the inherent spurious signals that are inversely proportional to frequency, sometimes referred to as the $1/f$. noise, are eliminated, resulting in a net gain in resolution despite some information loss in the process. Adjustment of the upper cutoff frequency of the filter may be successfully employed to eliminate or greatly reduce the magnitude of "spikes" or other short spurious pulses of very short rise time. The design of this filter may follow conventional practice.

The restriction of bandwidth in filter 24 may cause an increase in the rise time of any steep wavefronts in the video signal and thereby reduce the sharpness of the reproduced image. To offset this effect a crisping circuit 25 may be used to effect an apparent decrease in rise time. Circuits for accomplishing this result are known in the art. One such circuit is shown and described in the Proceedings of the I.R.E. for October, 1951, pages 1314–1322, in an article entitled, "A New Technique for Improving the Sharpness of Television Pictures," by Goldmark and Hollywood.

Spurious components in the video signal of greater duration than those removed by filter 24 may be removed in the signal modifier circuit 26. Time discrimination may be used for these components since they are of less duration than the brightness information components of the signal. One suitable circuit for this purpose is shown in FIGS. 15–15A and another in FIGS. 16–16A. The second circuit performs the additional function of modifying the video signal in such a way that when displayed on the reproducer screen only the boundary lines between areas of different brightness are shown. This feature is often useful in analyzing topography.

Referring to FIGS. 15–15A, the video output of circuit 25 is applied to blanking pulse clipper 280 and phase inverter 281. For illustrating the operation of the circuit, its performance with a simple video signal such as shown at *a* in FIG. 15A will be described. This signal, which represents only part of one horizontal line, comprises a blanking pulse 282, an information pulse 283 and two spurious pulses 284 and 285 of considerably shorter duration than the information pulse. After removal of the blanking pulse by clipper 280, the signal is applied to variable cutoff low pass filter 286. This filter will not pass pulses having a duration less than a predetermined value depending upon the time constant of the filter. This time constant may be adjusted by adjusting the cutoff frequency of the filter and is made long enough to exclude pulse such as 284 and 285 but not long enough to block the information pulse 283. Consequently, the waveform at the output of the filter is as shown at *b* in FIG. 15A. As seen, pulse 283 is delayed and its rise time considerably increased by the filter.

The output of filter 216 is applied through diode $V_2$ to a time constant network consisting of capacitor 287 and resistor 288. Diode $V_2$ serves two functions: one is to give the capacitor 287 a much shorter charging time than its discharge time and the other is to restore the direct current component to the wave at point *c*. The waveform at this point is illustrated in FIG. 15A*c*. It is seen that the leading edge of the pulse 283 follows very closely the leading edge of pulse 283 in waveform *b* since this represents the charging of capacitor 287 through diode $V_2$. However, the rate at which the pulse dies out at its trailing edge is determined by the time required for capacitor 287 to discharge through resistor 288. This time constant is made long enough to considerably stretch out the trailing edge, as shown at *c* in FIG. 15A.

The original video signal at *a* is also reversed in phase by network 281 and delayed by the proper amount in delay line 289 for it to have the time relation to waveform *c* shown at *d* in FIG. 15A. Waves *c* and *d* are then added to produce the waveform *e* at the grid of $V_3$. This tube is operated at cut-off so that only the positive-going portions of wave *e* appear in the waveform at *f*. Level control 290 is adjusted to cancel the gain introduced by tube $V_3$. The waveform at *f* contains only the undesired components 284 and 285 of the original signal.

The original video signal minus the undesired components is then obtained by adding waveforms *f* and *g* to produce the waveform *h*, the undesired components cancelling since they are of equal amplitudes and opposite phases in the waves *f* and *g*. The waveform at *g* is identical to that at *d* except for a very small delay, equal to that produced by $V_3$, introduced by network 291. The same graph has therefore been used to illustrate both waveforms in FIG. 15A.

Another form which the time discriminator may take is shown in FIGS. 16 and 16A. In addition to removing the undesired components from the video signal, this circuit also modifies the desired components of the signal in such a way that, when displayed by the picture reproducer, only the boundary lines between areas of different brightness are shown. This type of reproduction is sometimes advantageous in analyzing topographical information. The circuit of FIG. 16 is very similar to the circuit of FIG. 15. The waveform at *d* is obtained in exactly the same manner as the waveform at *c* in FIG. 15 except that it is reversed in phase due to the presence of the phase inverter 292. Diode $V_4$ serves the same function as diode $V_3$ in FIG. 15 but it is oppositely poled since a positive-going wave is desired at point *d*. The original signal is delayed by delay line 293 by the correct amount to establish the time relationship of wave *e* to wave *d* shown in FIG. 16A. Waves *e* and *d* are then added to produce the waveform *f* at the grid of $V_5$. As shown in FIG. 16A*f*, $V_5$ is biased to cut-off thus removing the undesired negative-going components 284 and 285. The sharp pulses 294 and 295, which result from the addition of waves *d* and *e*, and blanking pulse 282 appear in the output of $V_5$ amplified and reversed in phase, as shown in FIG. 16A*g*. The pulses 294 and 295 mark the edges of pulse 283 and produce the boundary line between areas of different brightness in the reproduced picture.

The video signal from the signal modifier circuit 26 is applied to the final video amplifier 27 over connection 296. This amplifier may be of conventional design with appropriate gain and bandwidth. The polarity of the video signal at this point should be such that the blanking pulses are negative-going. In the circuit shown, the phase reversal in the circuit of FIG. 15 or FIG. 16 will produce the correct polarity at connection 296 provided the phase at the output of circuit 25 is the same as that at the input of circuit 24 and provided there is no phase reversal in amplifier 27.

The reproducer 28 is shown in simplified schematic form in FIG. 17. Referring to this figure, 297 represents the envelope of a conventional cathode ray picture reproducer or kinescope having a phosphor screen 298, a thermionic cathode 299, a beam intensity control electrode 300 and an accelerating electrode 301. The tube also has a conventional high voltage system which is omitted for simplicity. The neck of the tube is surrounded by a deflection yoke 302 containing horizontal deflection coil 303, vertical deflection coil 304 and additional vertical coil 305 for beam wobble. The scanning and blanking of the reproducer tube beam are synchronized with the scanning and blanking of the beam in the image transducer 10 (FIG. 6). For this purpose a horizontal sawtooth voltage is derived from horizontal scanning circuit 11 of FIG. 6 and applied over conductor 262 to horizontal output circuit 306, and a vertical sawtooth voltage is derived from vertical scanning circuit 12 of FIG. 6 and applied over conductor 263 to vertical output circuit 307. These output circuits are designed to produce a linear relation between the currents in deflection coils 303 and 304 and the corresponding horizontal and vertical sawtooth waveforms applied to their inputs.

In a manner already explained in detail, negative-going horizontal and vertical retrace blanking pulses from retrace blanking circuit 13 and either dot interlace or spot sweep blanking pulses from FIG. 11A or 11B are applied to beam intensity control electrode 175 of transducer 10 (FIG. 6). These blanking pulses are also applied over conductor 218 to the control grid of the first tube 308 of a two stage blanking pulse amplifier. The last stage 309 of this amplifier is coupled to the accelerating electrode 301 for applying amplified negative-going blanking pulses to this electrode to cut off the reproducer tube beam.

An additional blanking of the reproducer also occurs whenever the target sensitization circuit (FIG. 8) is used. Referring to FIG. 8 through the action of tube 184 the beam of the transducer 10 is cut off during the positive-going portion of the waveform on the grid of this tube. This waveform is also applied to the grid of section B of tube 188 which, when $S_4$ is closed, acts as a cathode follower with resistor 310 as the load resistor. The upper end of this resistor is connected over conductor 311 to one end of potentiometer 312 in FIG. 17 the other end of which is connected to a point of positive potential. Therefore, the position of tap 313 to which the cathode is connected determines the bias of the beam intensity control electrode 300 relative to the cathode and therefore the threshold of the reproducer. Section B of tube 188 (FIG. 8) is normally biased so as to be nonconductive during the negative-going portion of the waveform on its grid, and therefore has no effect on the reproducer bias during this portion. However, during the positive-going portion, this section conducts heavily, raising the potential across resistor 310 and, as a result, raising the reproducer cathode potential and cutting off the reproducer beam.

When the circuit of FIG. 11A is used, the wobble generator 211 of this figure is coupled over conductors 214 to auxiliary vertical deflection winding 305 to produce the same wobble of the reproducer beam that is produced in the transducer beam by coil 213 (FIG. 6). When the circuit of FIG. 11B is used, $S_{10}$ is in its lower position so that horizontal coil 303 is coupled over conductors 233 to horizontal output circuit 231 of that figure.

The video signal from the output of video amplifier 27 (FIG. 1B) is applied over conductor 296 to the beam intensity control electrode 300 of the reproducer. The output stage of the amplifier provides the necessary ground return for this electrode.

While the reproducer has been shown as a conventional kinescope, a device of any type for converting a video signal into a visual image or for photographing the brightness information in the video signal may be used. Also, storage type reproducers may be used to advantage under certain circumstances, such as when target sensitization (FIG. 8) is used. In this case, FIG. 8A*c* illustrates the preferred operating cycle of the storage reproducer.

FIG. 18 shows schematically the details of the image converter 5 (FIG. 1A) that may be inserted in the place occupied by block 3 of the block diagram. This converter is designed especially for rapid sequence photography at low light levels. With this apparatus a storage element, which may be a long persistence phosphor or a charge storage grid, stores a plurality of frames of light information taken at a very high frame rate. The stored information is then amplified in the light amplifier and photographed at a much lower frame rate.

Referring to FIG. 18, an evacuated envelope 320 has at one end a photocathode 321 and at the other a phosphor screen 322. An optical image of the field of view is formed on photocathode 321 by lens system 2, as in the case of the image converter 4 of FIG. 3. The photocathode 321 converts the optical image into a corresponding electron image which, however, is normally blanked by the negative potential on shutter grid 323. When unblanked, this image is intensified by cascaded image intensifiers 324 and 325 of the type used in FIG. 3 and shown in FIG. 3A. The intensified electron image from the photocathode of intensifier 325 is caused to impinge on one of the areas 1, 2, 3 or 4 on the phosphor side of a larger image intensifier 326, depending upon the current magnitudes in vertical and horizontal deflection coils 327 and 328 of deflection yoke 329. Except for size, the image intensifier plate 326 is similar in all respects to plates 324 and 325. The generator 329 produces the necessary waveforms in coils 327 and 328 for directing the electron image to the four positions shown and also an unblanking pulse waveform for application to grid 323. The generator 329 is designed to go through one complete cycle of operation for each trigger pulse applied to it over conductor 330. The waveforms generated in each cycle of operation and the time relationships between them are as illustrated. During each cycle of operation the electron image is stationary at each of the positions 1, 2, 3 and 4 in succession with rapid transition between positions. During the transmissions the electron image is blanked, but is admitted to the phosphor of element 326 during the major portion of the dwell time at each position, as may be seen from the unblanking pulse waveform. By making the period of one cycle of operation of generator 329 of very short duration, four optical images may be formed on the phosphor side of element 326 at a very high frame rate.

The photocathode side of element 326 is also provided with a shutter grid 331 similar in function to grid 323. This grid is normally biased negatively with respect to the photocathode of 326 by a sufficient amount to cut off any electron emission from this photocathode due to the optical images on the phosphor side. Waveform generator 332 is similar to generator 329 and produces the same waveforms, but its cycle of operation has a longer period. Thus during one cycle of operation, the currents in coils 333 and 334 of deflection yoke 335 are such as to bring the electron emission from areas 1, 2, 3 and 4 of element 326, when unblanking pulses are applied to grid 331, to focus on phosphor screen 322 in succession.

A cycle of operation of the image converter may be initiated by closing $S_{14}$ to generate a sharp trigger pulse for application over conductors 330 and 336 to waveform generators 329 and 332. This pulse may also be derived from FIG. 5 over conductor 337 with $S_{15}$ in its upper position. The trigger pulse starts a cycle of operation in waveform generators 29 and 332, both circuits energizing their associated deflection coils for position 1 on element 326. Positions 2, 3 and 4 then follow but at a much higher rate for generator 329. The successive optical images formed in the phosphor of element 326 are transferred in succession at a much slower rate to phosphor screen 322. How slow this rate may be made depends upon the persistence of the phosphor of element 326. If a sufficiently slow rate can not be obtained with long persistent phosphors, a storage grid (not shown) may be used in front of the phosphor of element 326 to store the charge patterns in the electron images. Optical images of any duration may then be obtained in the phosphor by flooding the storage grid with electrons from a flood gun in the tube.

The successive optical images produced by phosphor screen 322 are transferred to the photocathode of the image transducer 10 (FIG. 6) by optical coupler 125 for amplification in the light amplifier and reproduction on the phosphor screen of reproducer tube 297 (FIG. 17). These images may be recorded by camera 338 in which the exposure is controlled by the same unblanking pulses that are supplied by generator 332 to grid 331.

Although the system of FIG. 18 is illustrated for a sequence of four frames, a sequence of any number of frames may be provided within practical limitations. Also, for simplicity, the necessary axial magnetic focussing field, electrostatic focussing elements and high voltage power supply have been omitted from FIG. 18 since these features follow standard design practice for cathode ray tubes of this type.

FIG. 19 illustrates the construction of the image converter 6 (FIG. 1A) which may be substituted for block 3 to convert the light amplifier system to a two-color system for providing more information from the viewed scene than can be derived from a grey scale rendition. In this arrangement the light from lens system 2 is split into red and blue-green components by a dichroic mirror and the two components applied to two image converters 339 and 340, as shown. These images converters are alike, and may be similar ot the image converter of FIG. 3, except that converter 339 is preferably provided with a photocathode having maximum sensitivity in the red portion of the spectrum and converter 340 with a photocathode having maximum sensitivity in the blue-green portion. The optical images on the phosphors of converters 339 and 340 are transferred to the photocathode of the image transducer 10 (FIG. 6) by optical coupler 125 for amplification in the light amplifier and reproduction on the phosphor screen of the reproducer tube 297 (FIG. 17). The reproduced images are then passed through red and blue-green transparent filters and recombined into a single image for viewing on a screen by an optical system that is the reverse of that preceding the image converters 339 and 340.

I claim:

1. A light amplifying system for resolving the optical information in scenes of extremely low brightness and contrast comprising: an image converter, having a photocathode, a phosphor screen and a cascade of electron image intensifiers between said photocathode and said phosphor screen, for receiving an optical image on its photocathode and producing a corresponding amplified optical image on its phosphor screen; means for forming an optical image of a scene on said photocathode; an optical image to video signal transducer having a photocathode, a target electrode in the form of a thin flat member having low lateral conductivity but relatively high conductivity between faces, a fine mesh conductive target screen positioned close to said target electrode on the photocathode side for collecting secondary electrons emitted by said target electrode, and at least one electron image intensifier situated between said photocathode and said target screen for converting an optical image on said photocathode into a corresponding positive charge distribution pattern on said target electrode, having means for vertically and horizontally scanning said target electrode with a low velocity electron beam to produce a return beam of electrons from said target modulated in accordance with said charge pattern, and having an electron multiplier for receiving and amplifying said return beam to produce an amplified video signal; optical coupling means for transferring the optical image on the phosphor screen of said image converter to the photocathode of said image transducer; a reproducer for converting a video signal into a visual image, said reproducer having a phosphor screen, means providing an electron beam for exciting said phosphor screen and means for vertically and horizontally scanning said phosphor screen with said beam in synchronization with the vertical and horizontal scanning of the target electrode of said transducer; target sensitization means synchronized with the vertical scanning of said transducer and coupled to said target screen for periodically blanking the electron beams of said transducer and reproducer for a predetermined number of successive vertical scanning periods and for raising the potential of said target screen during the next succeeding vertical scanning period by an amount approximately equal to the maximum negative charge acquired by a target area of zero positive charge when scanned by said transducer beam; means receiving the video signal output of said transducer and coupled back to said transducer for increasing the transducer scanning beam intensity whenever said video signal magnitude exceeds a predetermined value; target charge eraser means synchronized with the vertical scanning of said transducer for increasing the intensity of the transducer scanning beam for the duration of each $n^{th}$ vertical scanning period, where $n$ is an integer substantially greater than unity; means for sensing the average brightness of the scene viewed by said image converter and for controlling the intensity of the scanning beam in said transducer as a direct function of said average brightness; a horizontal shading circuit receiving the video signal output of said transducer and synchronized with the horizontal scanning of said transducer for controlling the amplitude of said video signal during each horizontal scanning period as a predetermined function of time; a variable gain video amplifier receiving the video signal from said horizontal shading circuit, said amplifier being coupled to said average scene brightness sensing means for controlling the amplitude of said video signal as an inverse function of said scene brightness; a vertical shading circuit receiving the video signal output of said variable gain amplifier and synchronized with the vertical scanning of said transducer for controlling the amplitude of the video signal during each vertical scanning period as a predetermined function of time; adjustable threshold and amplitude limiter means coupled to the output of said vertical shading circuit for eliminating that part of the video signal below a selected minimum value and above a selected maximum value; a gamma control circuit coupled to the output of said limiter means for adjusting the slope and configuration of the relationship between the magnitude of its output signal and the magnitude of its input signal; a bandpass filter having an adjustable low cutoff frequency for reducing low frequency spurious signals and an adjustable high cutoff frequency for reducing spurious signals of short rise time and duration; a crispening circuit coupled to the output of said filter for restoring the steepness of video signal wavefronts with increased rise time due to said filter; a signal modifier circuit coupled to the output of said crispening circuit for removing spurious signal components of longer duration that those removed by said filter; a final video amplifier coupled to the output of said signal modifier; and means for controlling the intensity of the scanning beam of said reproducer in accordance with the magnitude of the video signal output of said final amplifier.

2. Apparatus as claimed in claim 1 and in addition: means for imparting a low amplitude oscillatory vertical deflection in unison to the scanning beams of the transducer and reproducer; means synchronized with the horizontal scanning of said transducer for producing a series of rectangular blanking pulses having a duration of one-half the repetition interval and a repetition rate that is a multiple of the horizontal scanning rate in which the multiple is an integer plus ½; means for applying said blanking pulses to said transducer and reproducer for blanking their scanning beams to produce dot interlace scanning; and means for applying said blanking pulses to said target screen for reducing the potential of said screen during each blanking pulse.

3. Apparatus as claimed in claim 1 and in addition: means for producing in unison a horizontal scanning motion of the beams of said transducer and reproducer that consists of a series of contiguous stationary positions of the scanning spot along the horizontal line with rapid transitions between stationary positions; means for generating blanking pulses coincident with said transitions; means for applying said blanking pulses to said transducer and reproducer for blanking their beams during said transitions; and means for applying said blanking pulses to said target screen for reducing the potential of said screen during each blanking pulse.

4. Apparatus as claimed in claim 1 in which there is provided a shutter grid adjacent to the photocathode of said image converter; means biasing said grid negative relative to said photocathode sufficiently to prevent electron emission from said photocathode; and means synchronized with the vertical scanning of said transducer for applying positive-going pulses of predetermined duration to said shutter grid at the vertical scanning rate to permit emission from said photocathodes for the duration of each pulse.

5. Apparatus as claimed in claim 1 and in addition: a shutter grid adjacent to the photocathode of said image converter; means biasing said grid negative relative to said photocathode sufficiently to prevent electron emission from said photocathode; a source of short intense pulses of light for illuminating the field of view of said light amplifier system; means synchronized with the vertical scanning of said transducer for pulsing said light source at the vertical scanning rate; means sensing the light output of said light source for producing a trigger pulse at each light pulse; means for adjustably delaying said trigger pulses; and means triggered by said delayed pulses for applying positive-going pulses of predetermined duration to said shutter grid to permit emission from said photocathode for the duration of each pulse.

6. Apparatus as claimed in claim 1 in which the last electron image intensifier of said cascade in said image converter is much larger than the electron image emitted by the penultimate intensifier in said cascade; a first shutter grid adjacent to the photocathode of said image converter; means biasing said first shutter grid negative relative to said photocathode sufficiently to prevent electron emission from said photocathode; a second shutter grid adjacent said last image intensifier; means biasing said second shutter grid negative relative to said last image intensifier sufficiently to prevent electron emission therefrom; first positioning means responsive to an applied trigger pulse to go through one cycle of operation in which it positions the electron image from said penultimate intensifier at a plurality of non-overlapping positions on said last intensifier in succession with equal dwell times at each position and rapid transitions between positions and in which it generates an unblanking pulse during each dwell time between said transitions; means for applying said unblanking pulses to said first shutter grid for permitting electron emission from said photocathode for the duration of each pulse; second positioning means responsive to an applied trigger pulse to go through one cycle of operation in which it directs the intensified electron images from the image positions established on said last intensifier by said first positioning means to the phosphor screen of said image converter in the same succession established by said first positioning means with equal dwell times on said phosphor screen and rapid transitions between images and in which it generates an unblanking pulse during each dwell time between said transitions, the period of said cycle of operation being longer than the period of a cycle of operation of said first positioning means; means for applying the unblanking pulses generated by said second positioning means to said second shutter grid for permitting electron emission from said last intensifier for the duration of each pulse; means synchronized with the unblanking pulses produced by said second positioning means for photographing the optical image at said reproducer during each pulse; and means for applying trigger pulses to said first and second positioning means simultaneously.

No references cited.

DAVID G. REDINBAUGH, *Primary Examiner.*